(12) United States Patent
Velentzas et al.

(10) Patent No.: US 12,406,433 B2
(45) Date of Patent: Sep. 2, 2025

(54) PROCESSING FRAGMENTS WHICH HAVE A SHADER-DEPENDENT PROPERTY IN A GRAPHICS PROCESSING SYSTEM

(71) Applicant: Imagination Technologies Limited, Kings Langley (GB)

(72) Inventors: Panagiotis Velentzas, Hertfordshire (GB); John W. Howson, St Albans (GB); Richard Broadhurst, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 258 days.

(21) Appl. No.: 18/212,748

(22) Filed: Jun. 22, 2023

(65) Prior Publication Data

US 2024/0119662 A1    Apr. 11, 2024

(30) Foreign Application Priority Data

Jun. 22, 2022    (EP) .................................... 22386040

(51) Int. Cl.
*G06T 15/40* (2011.01)
*G06T 1/20* (2006.01)
(Continued)

(52) U.S. Cl.
CPC ............ G06T 15/405 (2013.01); G06T 15/80 (2013.01); *G06T 1/20* (2013.01); *G06T 11/40* (2013.01);
(Continued)

(58) Field of Classification Search
CPC ... G06T 15/405; G06T 15/80; G06T 2210/62; G06T 11/40; G06T 15/40; G06T 15/005; G06T 1/20
See application file for complete search history.

(56) References Cited

U.S. PATENT DOCUMENTS 9,153,070 B2 * 10/2015 Nystad ...................... G06T 1/20
10,074,210 B1 * 9/2018 Spencer .................. G06T 15/40
(Continued)

FOREIGN PATENT DOCUMENTS

EP    3933778 A2    1/2022

OTHER PUBLICATIONS

GÃ¼nther et al, Opacity Optimization for Surfaces, 2014, Computer Graphics Forum (Year: 2014).*

*Primary Examiner* — YuJang Tswei
(74) *Attorney, Agent, or Firm* — Potomac Law Group, PLLC; Vincent M DeLuca

(57) ABSTRACT

Methods and graphics processing units for processing a plurality of fragments in a graphics processing system. A received first fragment is processed by performing an early depth test with hidden surface removal logic using a depth buffer; in response to the first fragment passing the early depth test, executing one or more instructions of a shader program for the first fragment on the processing logic to determine the property of the first fragment; and after the determination of the property of the first fragment, performing a late depth test on the first fragment with the hidden surface removal logic using the depth buffer. After said receiving a first fragment, a second fragment to be processed is received, wherein the second fragment does not have a shader-dependent property. The second fragment is processed by, before said late depth test is performed on the first fragment, performing an early depth test on the second fragment with the hidden surface removal logic.

20 Claims, 6 Drawing Sheets

(51) Int. Cl.
*G06T 11/40* (2006.01)
*G06T 15/00* (2011.01)
*G06T 15/80* (2011.01)

(52) U.S. Cl.
CPC ............ *G06T 15/005* (2013.01); *G06T 15/40* (2013.01); *G06T 2210/62* (2013.01)

(56) References Cited

U.S. PATENT DOCUMENTS

| | | | | |
|---|---|---|---|---|
| 2009/0189897 | A1* | 7/2009 | Abbas | G06T 15/80 345/426 |
| 2010/0302246 | A1* | 12/2010 | Jiao | G06T 15/40 345/506 |
| 2011/0084976 | A1* | 4/2011 | Duluk, Jr. | G06T 15/005 345/522 |
| 2014/0354654 | A1* | 12/2014 | Heggelund | G06T 1/20 345/501 |
| 2019/0259193 | A1* | 8/2019 | Harris | G06T 1/20 |
| 2021/0407191 | A1 | 12/2021 | Yang et al. | |

* cited by examiner

PROCESSING FRAGMENTS WHICH HAVE A SHADER-DEPENDENT PROPERTY IN A GRAPHICS PROCESSING SYSTEM

CROSS-REFERENCE TO RELATED APPLICATIONS AND CLAIM OF PRIORITY

This application claims foreign priority under 35 U.S.C. 119 from European Patent Application No. 22386040.4 filed on 22 Jun. 2022, which is incorporated by reference herein in its entirety.

FIELD

This disclosure relates to graphics processing. In particular, this disclosure relates to methods and graphics processing systems for rendering one or more fragments which have a shader-dependent property.

BACKGROUND

Graphics processing systems are used to process graphics data in order to render images of scenes. Surfaces of objects within the scene to be rendered can be described using items of geometry, which may for example be primitives or patches. Primitives tend to be simple geometric shapes, such as triangles, lines or points, and can be defined by data (e.g. position and attribute data) associated with the vertices of the primitives. In contrast, patches tend to be used to represent more complex (e.g. non-planar) surfaces, and can be processed by performing tessellation in order to determine tessellated primitives which approximately represent the patch, and which can then be processed in the graphics processing system.

FIG. 1 shows a graphics processing system 100 which can be used to process graphics data to render an image of a scene. The graphics processing system 100 comprises a graphics processing unit (GPU) 102 which comprises geometry processing logic 104 and rendering logic 106. The graphics processing system 100 also comprises a memory 108. It is noted that although the memory 108 is shown as a single block of memory in FIG. 1, this is for illustrative purposes only, and the memory 108 may be made up of multiple blocks of memory. The geometry processing logic 104 comprises pre-processing logic 112 and tiling logic 114. The rendering logic 106 comprises a fetch unit 116, rasterization logic 118, hidden surface removal logic 120, a depth buffer 122, a tag buffer 124 and processing logic 126. The rendering logic 106 may further comprise post-processing logic 128, which may be referred to as a "pixel back end" or "PBE". In general, the logic blocks and units described herein may be implemented in hardware (e.g. fixed-function circuitry), software (e.g. as software code running on a processor) or a combination of both. However, the processing logic 126 shown in FIG. 1 is configured to execute computer software programs (e.g. "shader programs"). For example, the processing logic 126 may be a Single Instruction Multiple Data (SIMD) processing unit configured to execute a single instruction on multiple data items in parallel. Methods of performing SIMD processing are known in the art.

The graphics processing system 100 shown in FIG. 1 is a tile-based rendering system, but this is just described as an example, and it is noted that other graphics processing systems are not tile-based. In the tile-based graphics processing system 100, the 2D rendering space in which images are rendered is subdivided into a plurality of tiles. In operation, there are two phases: (i) a geometry processing phase in which the geometry processing logic 104 performs geometry processing to process primitives or other items of geometry, such as patches, and (ii) a rendering phase in which the rendering logic 106 performs fragment processing on fragments to determine rendered values, e.g. rendered pixel values representing an image.

For example, in the geometry processing phase, the pre-processing logic 112 transforms the primitives (e.g. the vertices of the primitives) into the rendering space. The pre-processing logic 112 also performs processes such as clipping and culling on primitives which are outside of a view frustum representing a viewable region of the scene from the viewpoint from which the scene is being rendered. The tiling logic 114 then determines which primitives are relevant for rendering which tiles of the rendering space. The tiling logic 114 can generate tile control lists which indicate, for each tile, which primitives are relevant for rendering that tile (i.e. which primitives are present within that tile). The transformed primitive data (describing the transformed primitives in rendering space) and the tile control lists are stored in the memory 108.

Then in the rendering phase the fetch unit 116 fetches the tile control list for a tile from the memory 108 and fetches the transformed primitive data which is indicated in the tile control list for the tile from the memory 108. The transformed primitive data (e.g. vertex data for transformed primitives) is passed to the rasterization logic 118 which performs rasterization (which may be referred to as "scan conversion" or "sampling") on the transformed primitive data to determine primitive fragments at sample positions within the tile that is currently being processed in the rendering logic 106. As a matter of terminology, a "fragment" is an element of a primitive ata sample position. A sample position may correspond to a pixel position of a pixel for an image being rendered, but in some examples each pixel position may correspond to multiple sample positions, wherein each pixel value can be determined by combining multiple processed fragment values. This can be useful in some situations, e.g. to perform anti-aliasing, but it does increase the amount of processing performed in the rendering logic 106.

The GPU 102 shown in FIG. 1 is configured to perform deferred rendering. Other GPUs can be configured to perform non-deferred rendering. In a deferred rendering technique, hidden surface removal is performed on fragments before texturing and/or shading is performed on the fragments. Shading can be performed in respect of a fragment by executing a shader program to determine a shaded fragment. This shaded fragment may represent a rendered value for the sample position of the shaded fragment. Shader programs are generally written in software, so users can define how they want the fragments to be shaded. Often, a shader program can involve applying a texture to a fragment. This texturing process involves sampling a texture, e.g. fetching texture data from the memory 108 and sampling the texture at a particular position (which often involves performing interpolation on the texel values defining the texture). Fetching texture data from memory often takes many processing cycles, and sampling the texture can involve complex calculations, so texturing is an expensive process (in terms of latency and power consumption). Furthermore, shader programs often involve other complex instructions too. In a non-deferred rendering system, the shader programs would typically be executed for all of the rasterized fragments, and then hidden surface removal would be applied to determine which of those shaded fragments is visible at each sample position. Often, there can be many layers of overlapping fragments from different objects in a scene being rendered, so many (e.g. well over half) of the fragments may be occluded. Therefore, a lot of the processing performed in a non-deferred rendering system involves shading fragments which have no effect on the final rendered values because they are occluded.

Deferred rendering systems (such as the system shown in FIG. 1) aim to reduce the amount of processing that is performed (compared to non-deferred rendering systems) by performing hidden surface removal before the shading and/or texturing. Therefore, as shown in FIG. 1, the fragments outputted from the rasterization logic 118 are processed by the hidden surface removal (HSR) logic 120, thereby removing occluded fragments. The hidden surface removal performed on a fragment by the HSR logic 120 comprises performing a depth test on the fragment against a corresponding depth value stored in the depth buffer 122. The depth buffer stores a depth value for each sample position in the tile being processed. The tag buffer 124 stores a primitive ID for each sample position in the tile being processed. If the fragment passes the depth test then the depth value of the fragment is used to update the depth value for the corresponding sample position in the depth buffer 122, and the primitive ID of the primitive that the fragment relates to is stored at the corresponding sample position in tag buffer 124. The depth value and primitive ID may overwrite any previously stored values at the sample position. Therefore, the depth buffer 122 keeps track of the current visible depth value at each sample position in the tile, and the tag buffer 124 keeps track of an ID of the primitive which is present and as yet unoccluded at each sample position in the tile. If all of the fragments are opaque then all of the fragments in the tile can be processed by the HSR logic 120, such that the tag buffer 124 then stores, for each sample position, the primitive ID of the primitive which has a fragment that is visible at that sample position. The tag buffer 124 can then be "flushed", i.e. the primitive IDs in the tag buffer 124 can be sent to the processing logic 126 where shader programs can be executed (e.g. in a SIMD manner) for the visible fragments at the respective sample positions. The execution of a shader program for a fragment at the processing logic 126 generates a shaded fragment. If no further processing is to be performed in respect of the sample position of the shaded fragment, then the shaded fragment represents a rendered value for the sample position. The rendered values can be written out from the processing logic 126 to the memory 108 (e.g. to a frame buffer in the memory 108). The post-processing logic 128 may perform some post-processing, such as rotation or blending, on the shaded fragments output from the processing logic 126 before the rendered values are output to the memory 108. If all fragments are opaque, the tag buffer 124 only has to be flushed once per tile, and in that case the depth buffer 122 is reset ready for the next tile.

This deferred rendering system works very efficiently for opaque fragments (i.e. fragments of opaque objects, or in other words fragments associated with an opaque object type) because shading only needs to be performed for fragments which are not occluded. However, not all objects are opaque. Some objects may be translucent, and some objects may be referred to as "punch through" objects. Fragments of "punch through" objects have shader-dependent presence. As described below, the "presence" referred to here is presence of fragments in the primitive, rather than for example presence in a final image, where other factors, such as occlusion, may apply. Fragments of a punch through primitive which are present may be opaque or translucent. Terms other than "punch through" (e.g. "partially transparent") may sometimes be used in the art to refer to objects for which fragments have shader-dependent presence, but the term "punch through" is used herein to refer to these types of objects. Punch through objects can be very useful for representing fine edge or shape detail at a scale smaller than is efficiently representable using triangles/primitives, or for representing objects with voids (such as holes) in them. If a fragment has a shader-dependent presence this means that the presence of the fragment is determined by the shader program which is executed for the fragment. For example, the code of the shader program may include a "discard" instruction to discard some of the fragments in a primitive. For example, the discard operation may be based on the alpha channel of a texture which is applied to the fragments. Therefore, in the deferred rendering system 100 shown in FIG. 1, when a punch through fragment (i.e. a fragment with shader-dependent presence) is received at the hidden surface removal logic 120 from the rasterization logic 118, the presence of the fragment is not known. Fragments associated with a punch through object type should be processed by the HSR logic 120 such that it is possible to see through the holes left after the removal of any fragments that are determined not to be present, i.e. after those fragments have been discarded. Therefore, if the fragment passes a depth test in the HSR logic 120 then, since the fragment might not be present, the depth buffer 122 and the tag buffer 124 cannot be updated by simply overwriting the stored values without risking introducing artefacts into the rendered values. If the punch through fragment, having passed the depth test, is determined to overlap with another fragment already in the tag buffer 124, then the tag buffer 124 is flushed thereby sending the primitive IDs from the tag buffer 124 to the processing logic 126. The primitive ID of the punch-through fragment is also sent to the processing logic 126. The tag buffer may also be flushed after processing the last punch through fragment, or on receipt of the first fragment of a new object type at the HSR logic 120. The processing logic 126 executes shader programs for the fragments flushed from the tag buffer 124. The execution of the shader program for a punch through fragment determines the presence or non-presence of the fragment. For fragments determined to be present, the processing logic 126 then provides information to the hidden surface removal logic 120 (as indicated by the dashed line in FIG. 1) to indicate the presence of the fragment and then waits for feedback from the hidden surface removal logic 120. If a fragment is determined by the processing logic 126 to be not present (e.g. if it is discarded by the execution of the shader program at the processing logic 126) then in some examples, an indication of this 'non-presence' may be provided from the processing logic 126 to the hidden surface removal logic 120, but in some other examples the processing logic 126 might not provide an indication of 'non-presence' back to the hidden surface removal logic 120. If the punch through fragment was not discarded by the shader program, then the hidden surface removal logic 120 performs another depth test (which may be referred to as a "late depth test") on the fragment. As the presence of the punch through fragment is now known, the depth buffer can be updated as normal and the result of the late depth test can be fed back to the processing logic 126. When the processing logic 126 receives this feedback it can continue to process the fragment in dependence on the result of the late depth test. As mentioned above, the processing logic 126 may be configured to operate in a SIMD manner, such that groups of fragments are processed in parallel. The processing logic 126 pauses the processing of a whole group of fragments whilst it waits for the feedback from the HSR logic 120 in relation to fragments of that group. In some cases, the shaded fragments might have been produced but the processing logic 126 waits for the feedback from the HSR logic 120 in order to determine what to do with the shaded fragments, while in other cases the processing logic 126 pauses execution of the shader program (e.g. deschedules it) while it waits for the feedback from the HSR logic 120.

"Tags" stored in the tag buffer 124 are primitive identifiers which associate a fragment with the primitive of which it is a part, and which allow attributes such as texturing and shading data for the primitive to be fetched when required. The tag buffer 124 is used to hold a tag for a fragment which has most recently passed a depth test (e.g. a fragment from the front most primitive) for each sample position in the part of the rendering space currently being processed (e.g. in a tile when the system 100 is a tile-based system). Tags for opaque fragments which pass the depth tests are typically written into the tag buffer 124 even if they overwrite an existing tag. Fragments from translucent and punch through primitives may need to be combined with fragments that they overdraw. The combining of these fragments typically must be performed in the order that they were submitted by the application. As such, whenever translucent or punch through fragments are found to lie in front of fragments currently stored within the tag buffer 124, the HSR logic 120 flushes currently stored tags to the processing logic 126. As described above, in the case of punch through fragments, the presence of fragments, and hence whether their depth values should be updated in the depth buffer 122, is determined by the shader programs executed at the processing logic 126. Therefore, tags for punch through primitives are also sent for processing by the processing logic 126 after any tags currently stored within the tag buffer 124 have been flushed. It is noted that the combination of a tag and a position in the tag buffer 124 defines a fragment, so the flushing of tags from the tag buffer 124 can be considered to be flushing fragments from the tag buffer 124. Conceptually, it makes sense to consider fragments being stored in the tag buffer 124 and fragments being flushed out to the processing logic 126. In a practical implementation, this conceptual flow of fragments is embodied by storing tags in the tag buffer 124 and flushing tags from the tag buffer 124.

Whilst fragments of a punch through object are "in-flight" (e.g. from the time that a punch through object is received at the rasterization logic 118 up until all its alpha-test-surviving fragments have performed the late depth test), the processing of any incoming non-punch through objects is stalled, e.g. before the non-punch through objects are rasterized by the rasterization logic 118 and/or before the fragments of the non-punch through objects are processed by the HSR logic 120. The rendering logic 106 adheres to submission order (i.e. it processes objects, e.g. primitives, in the order in which they are received), so when a non-punch through object is received after a punch through object then the pipeline of the rendering logic 106 stalls until the depth of the punch through fragments has been resolved. Making the rendering logic 106 wait (or "stall") during the processing of punch through fragments introduces latency into the graphics processing system 100. In particular, stalling the rendering logic 106 can render the system unable to hide large latencies of certain pipelined operations, such as fetching textures from external memory. Therefore processing a mix of punch through and non-punch through objects can cause a significant reduction in the performance of the graphics processing system 100 compared to processing only opaque objects.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

There is provided a method of processing a plurality of fragments in a graphics processing system which comprises: (i) hidden surface removal logic, and (ii) processing logic configured to execute shader programs for fragments, the method comprising:

receiving a first fragment to be processed, wherein the first fragment has a shader-dependent property;
 processing the first fragment, wherein said processing the first fragment comprises:
  performing an early depth test on the first fragment with the hidden surface removal logic using a depth buffer;
  in response to the first fragment passing the early depth test, executing one or more instructions of a shader program for the first fragment on the processing logic to determine the property of the first fragment; and
  after the determination of the property of the first fragment, performing a late depth test on the first fragment with the hidden surface removal logic using the depth buffer;
 after said receiving a first fragment, receiving a second fragment to be processed, wherein the second fragment does not have a shader-dependent property; and
 processing the second fragment, wherein said processing the second fragment comprises, before said late depth test is performed on the first fragment, performing an early depth test on the second fragment with the hidden surface removal logic.

Said processing the first fragment may further comprise updating a depth value in the depth buffer in response to the first fragment passing the late depth test.

Said processing the second fragment might not comprise updating a depth value in the depth buffer in response to the second fragment passing the early depth test.

Said processing the second fragment may further comprise, after said late depth test is performed on the first fragment, performing a late depth test on the second fragment with the hidden surface removal logic using the depth buffer.

Said processing the second fragment may further comprise updating a depth value in the depth buffer in response to the second fragment passing the late depth test.

Said processing the second fragment may further comprise, in response to the second fragment passing the early depth test, initiating processing of the second fragment on the processing logic which causes the late depth test to be performed on the second fragment.

Said processing the second fragment may further comprise:

in response to causing the late depth test to be performed on the second fragment, pausing the execution of a shader program for the second fragment while the late depth test is performed on the second fragment with the hidden surface removal logic; and in response to the second fragment passing the late depth test, executing a one or more instructions of the shader program for the second fragment on the processing logic.

Said processing the first fragment may further comprise, in response to the first fragment passing the late depth test, executing a further one or more instructions of the shader program for the first fragment on the processing logic.

The plurality of fragments may be ordered according to a submission order, and the plurality of fragments may be processed in accordance with the submission order.

Said early depth test on the second fragment may be performed in response to determining that the first and second fragments have compatible depth compare modes.

The method may further comprise:
fetching primitive data defining primitives in a scene to be rendered; and
performing rasterization on the primitives to generate fragments, wherein said first fragment is generated by performing rasterization on a first primitive which has a shader-dependent property, and wherein said second fragment is generated by performing rasterization on a second primitive which does not have a shader-dependent property.

The method may further comprise: before performing said processing of the second fragment, determining that there is at least one preceding fragment for which a late depth test is still to be performed. For example, it may be determined whether there is at least one preceding fragment for which a late depth test is still to be performed which could cause a depth value in the depth buffer to be accessed. "Accessing" a depth value in the depth buffer may be reading the depth value in order to perform a depth test or updating the depth value.

Said determining that there is at least one preceding fragment for which a late depth test is still to be performed may be performed in response to fetching primitive data for the second primitive. Said rasterization on the second primitive may be performed in response to determining that there is at least one preceding fragment for which a late depth test is still to be performed.

The method may further comprise:
after said receiving a second fragment, receiving a third fragment to be processed, wherein the third fragment does not have a shader-dependent property;
determining that there are no preceding fragments for which a late depth test is still to be performed; and
after determining that there are no preceding fragments for which a late depth test is still to be performed, processing the third fragment, wherein said processing the third fragment comprises performing a single depth test on the third fragment with the hidden surface removal logic using the depth buffer.

Said early depth test on the second fragment may be performed with the hidden surface removal logic using the depth buffer.

The method may further comprise storing, for each of a plurality of depth values in the depth buffer, an in-flight indication to indicate whether there are any preceding fragments for which a late depth test is still to be performed. Said performing an early depth test on the second fragment with the hidden surface removal logic may be performed using the depth buffer in response to determining that the in-flight indication for the depth value in the depth buffer at a position corresponding to the second fragment indicates that there is at least one preceding fragment for which a late depth test is still to be performed.

The method may further comprise: for each of the depth values in the depth buffer for which there is at least one preceding fragment for which a late depth test is still to be performed, storing a depth compare mode indication to indicate a depth compare mode for said at least one fragment for which a late depth test is still to be performed. Said performing an early depth test on the second fragment with the hidden surface removal logic using the depth buffer may be performed in response to determining that a depth compare mode of the second fragment is compatible with the depth compare mode indicated by the depth compare mode indication for the depth value in the depth buffer at a position corresponding to the second fragment.

Said early depth test on the second fragment may be performed with the hidden surface removal logic using an alternative depth buffer.

The method may further comprise determining a utilization indication which indicates a level of utilization of the processing logic. Said performing an early depth test on the second fragment with the hidden surface removal logic may be performed in response to determining that the indicated level of utilization of the processing logic is below a threshold level of utilization.

The utilization indication may be based on one or more of:
a state of a task queue which holds pending tasks to be processed by the processing logic;
a number of instructions that are still to be executed in one or more shader programs that are currently being executed by the processing logic;
a number of tasks that have been mapped to an execution slot on the processing logic which are enabled and potentially running or are paused; and
a number of tasks that will be created and passed to the processing logic to be processed when a tag buffer is flushed.

Results of processing the first and second fragments may be used to render an image of a scene.

The shader-dependent property may be shader-dependent presence or shader-dependent depth.

There is provided a graphics processing unit configured to process a plurality of fragments, the graphics processing unit comprising:
hidden surface removal logic; and
processing logic configured to execute shader programs for fragments,
wherein the graphics processing unit is configured to:
receive, at the hidden surface removal logic, a first fragment to be processed, wherein the first fragment has a shader-dependent property;
process the first fragment, wherein to process the first fragment the graphics processing unit is configured to:
perform an early depth test on the first fragment with the hidden surface removal logic using a depth buffer;
in response to the first fragment passing the early depth test, execute one or more instructions of a shader program for the first fragment on the processing logic to determine the property of the first fragment; and
after the determination of the property of the first fragment, perform a late depth test on the first fragment with the hidden surface removal logic using the depth buffer;
after the first fragment is received, receive at the hidden surface removal logic a second fragment to be processed, wherein the second fragment does not have a shader-dependent property; and process the second fragment, wherein to process the second fragment the graphics processing unit is configured to, before said late depth test is performed on the first fragment, perform an early depth test on the second fragment with the hidden surface removal logic.

To process the first fragment the graphics processing unit may be further configured to update a depth value in the depth buffer in response to the first fragment passing the late depth test.

To process the first fragment the graphics processing unit may be further configured to discard the first fragment in response to the first fragment failing the early depth test.

To process the first fragment the graphics processing unit may be further configured to discard the first fragment in response to the first fragment failing the late depth test.

To process the second fragment the graphics processing unit may be further configured to discard the second fragment in response to the second fragment failing the early depth test.

To process the second fragment the graphics processing unit may be further configured to:

after said late depth test is performed on the first fragment, perform a late depth test on the second fragment with the hidden surface removal logic using the depth buffer; and discard the second fragment in response to the second fragment failing the late depth test.

The graphics processing unit may be configured to stall the processing of the second fragment in response to identifying that the depth compare mode of the second fragment is an equal depth compare mode.

There may be provided a graphics processing unit configured to perform any of the methods described herein.

There is provided computer readable code configured to cause any of the methods described herein to be performed when the code is run.

There is provided a computer readable storage medium having stored thereon an integrated circuit definition dataset that, when processed in an integrated circuit manufacturing system, configures the integrated circuit manufacturing system to manufacture a graphics processing unit as described herein.

The graphics processing unit may be embodied in hardware on an integrated circuit. There may be provided a method of manufacturing, at an integrated circuit manufacturing system, a graphics processing unit. There may be provided an integrated circuit definition dataset that, when processed in an integrated circuit manufacturing system, configures the system to manufacture a graphics processing unit. There may be provided a non-transitory computer readable storage medium having stored thereon a computer readable description of a graphics processing unit that, when processed in an integrated circuit manufacturing system, causes the integrated circuit manufacturing system to manufacture an integrated circuit embodying a graphics processing unit.

There may be provided an integrated circuit manufacturing system comprising: a non-transitory computer readable storage medium having stored thereon a computer readable description of the graphics processing unit; a layout processing system configured to process the computer readable description so as to generate a circuit layout description of an integrated circuit embodying the graphics processing unit; and an integrated circuit generation system configured to manufacture the graphics processing unit according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
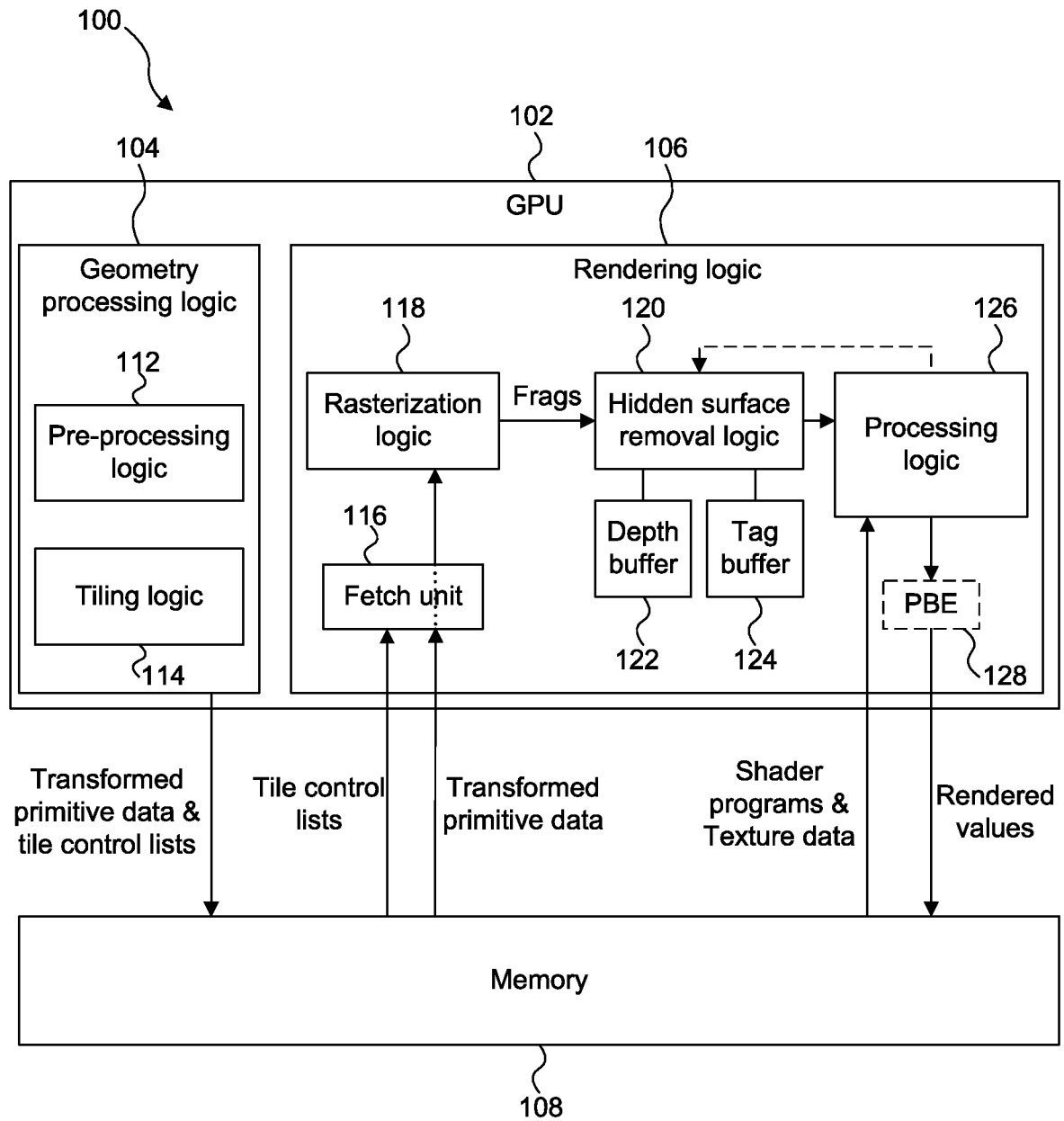
FIG. 1 shows a graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Examples described herein are implemented using a graphics processing system having the same structure as that shown in FIG. 1. The examples described below with reference to FIGS. 3a and 3b can avoid stalling the pipeline of the rendering logic 106 when a non-punch through object is received after a punch-through object. Removing, or reducing, occurrences in which the pipeline of the rendering logic 106 stalls will tend to reduce the latency, and improve the performance, of the graphics processing system 100.

"Shader-dependent properties" are described herein, which are properties of fragments (or objects) that are dependent upon the execution of a shader program at the processing logic 126 and which are relevant for the processing performed by the hidden surface removal logic 120. In other words, the shader-dependent property of a fragment affects the processing performed on the fragment by the hidden surface removal logic. For example, the shader-dependent property of a fragment may be relevant for performing depth testing at the hidden surface removal logic. In the main examples described in detail herein, the shader-dependent property is shader-dependent presence, but it is to be understood that in other examples, the same techniques could be used for processing fragments with different shader-dependent properties, e.g. shader-dependent depths.

Figure 2A:
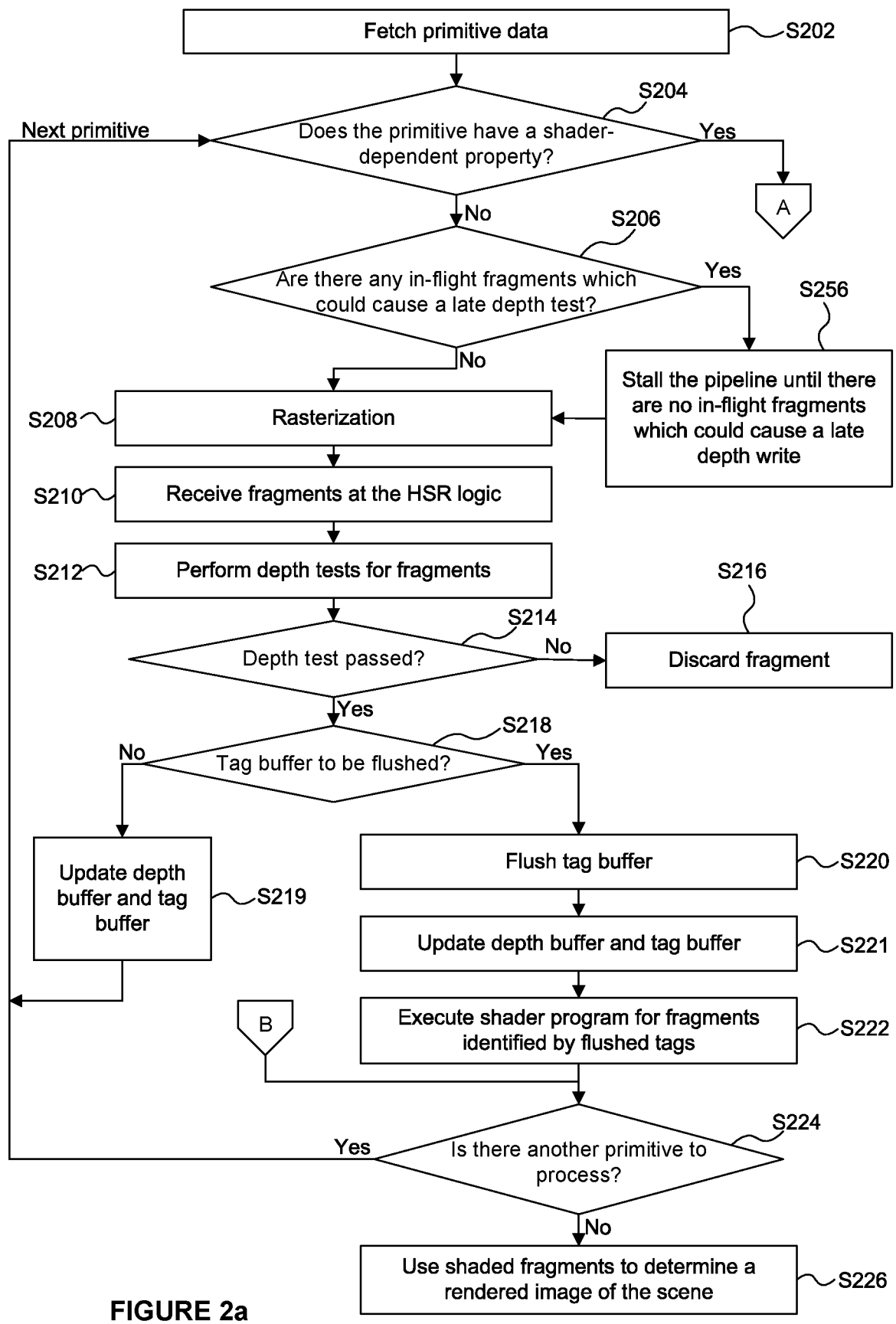
FIGS. 2a and 2b show a flow chart for a first method of processing fragments in a graphics processing system.
Figure 2B:
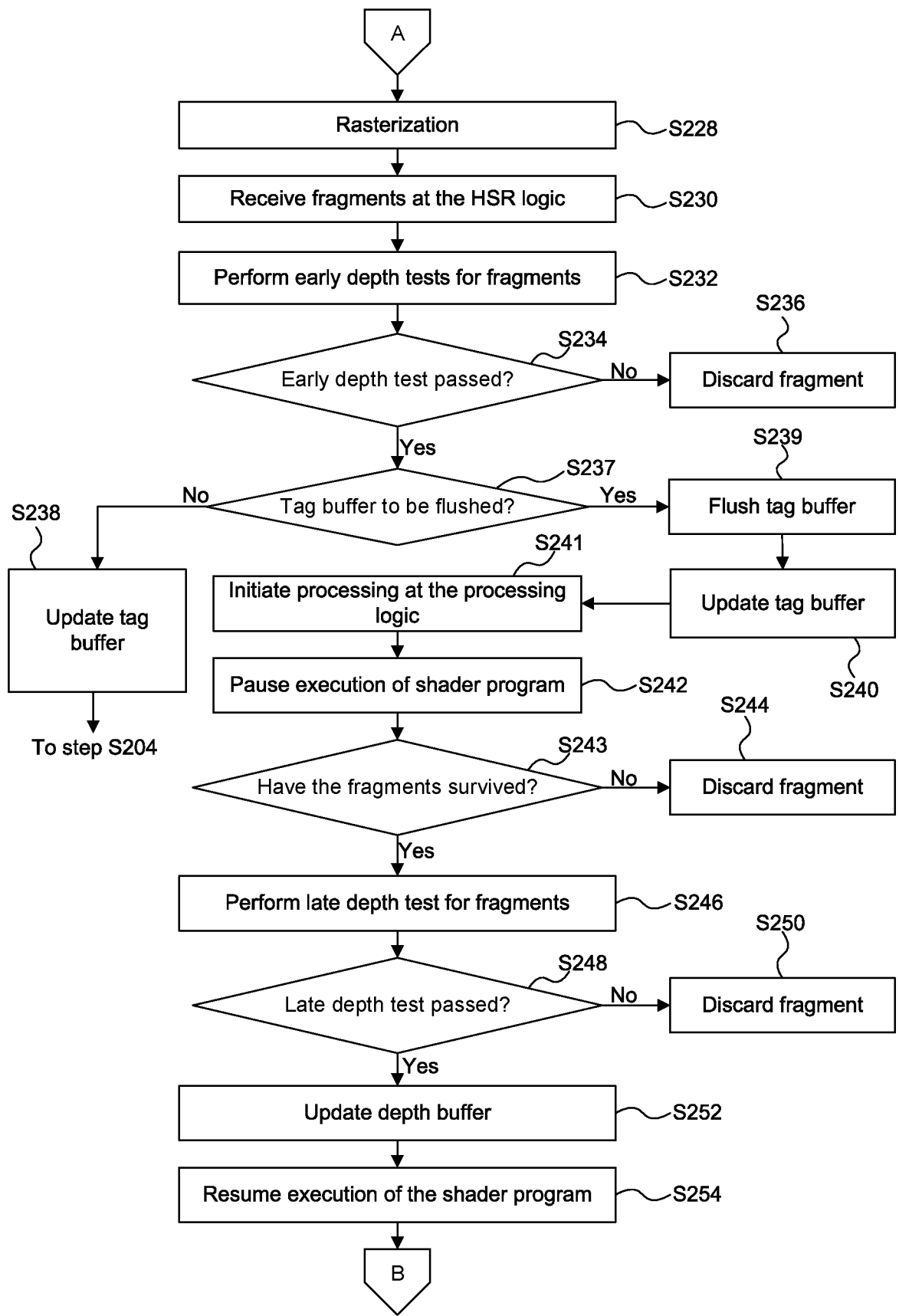

FIGS. 2a and 2b show a flow chart for a first method of processing fragments in a graphics processing system. These flow charts illustrate how the rendering logic 106 of a graphics processing system such as that described in the background section above processes a sequence of primitives which have a mix of object types, and in particular have a mix of punch through and non-punch through object types. In the example tile-based graphics processing system 100 shown in FIG. 1 it is noted that the geometry processing logic 104 will perform geometry processing to determine transformed primitive data and tile control lists, which are then stored in the memory 108 before the processing steps shown in FIGS. 2a and 2b are performed by the rendering logic 106.

In step S202 the fetch unit 116 fetches the tile control list for a tile from the memory 108 and fetches the transformed primitive data which is indicated in the tile control list for the tile from the memory 108.

In step S204, for a primitive, the rendering logic 106 (e.g. the fetch unit 116) determines whether the primitive has a shader-dependent property. For example, in step S204 it may be determined whether the primitive is a punch-through primitive (which has a shader-dependent presence) or whether the primitive has a shader-dependent depth. If it is determined that the primitive does have a shader-dependent property then the method passes to step S228, which is described below. If it is determined that the primitive does not have a shader-dependent property (e.g. if the primitive is opaque without a shader-dependent depth) then the method passes to step S206.

In step S206 the transformed primitive data (e.g. vertex data for a transformed primitive) is passed from the fetch unit 116 to the rasterization logic 118. In step S206 the rendering logic 106 (e.g. the rasterization logic 118) determines whether there are any in-flight fragments which could cause a late depth test to be performed using the depth buffer 122, e.g. which could cause a depth value in the depth buffer 122 to be accessed, e.g. for performing a late depth write to the depth buffer 122 or for reading the depth value so that a late depth test can be performed. For example if there are some fragments which have started being processed by the rendering logic 106 but which could still cause a depth write to the depth buffer 122 which is used for depth testing by the HSR logic 120 (e.g. punch through fragments which are being processed by the processing logic 126) then these are "in-flight fragments" which could cause a late depth write. As another example, if there are some fragments which have started being processed by the rendering logic 106 but which could still cause a late depth test to be performed using the depth buffer 122 (even if they will not cause a late depth write to be performed to the depth buffer 122) then these are "in-flight fragments" which could cause a late depth test to be performed. If it is determined that there are no in-flight fragments which could cause a late depth test to be performed using the depth buffer 122 then the method passes to step S208. If it is determined that there is at least one in-flight fragment which could cause a late depth test to be performed using the depth buffer 122 then the method passes to step S256, which is described below.

In step S208 the rasterization logic 118 performs rasterization (which may be referred to as "scan conversion" or "sampling") on the transformed primitive data to generate fragments at sample positions within the tile that is currently being processed in the rendering logic 106. As described above, a "fragment" is an element of a primitive at a sample position. The fragments are passed to the HSR logic 120. In step S210 the HSR logic 120 receives the fragments.

In step S212 the HSR logic 120 performs depth tests on the fragments. A depth test involves comparing a depth value of a fragment with a depth value at a corresponding sample position in the depth buffer 122 in accordance with a depth compare mode. For example, the depth compare mode may be a "less than" depth compare mode in which the fragment will pass the depth test if its depth value is less than the corresponding depth value stored in the depth buffer 122. In other examples, the depth compare mode may be a "greater than" depth compare mode in which the fragment will pass the depth test if its depth value is greater than the corresponding depth value stored in the depth buffer 122. Other depth compare modes are also known in the art (e.g. "less than or equal to", "greater than or equal to", "equal").

In step S214 the HSR logic 120 determines, for each fragment, whether the fragment passed the depth test performed in step S212. If a fragment fails the depth test then it is discarded in step S216. If a fragment passes the depth test then it is not discarded, and the method proceeds to step S218.

In step S218 the HSR logic 120 determines whether the tag buffer is to be flushed. It is determined that the tag buffer is to be flushed: (i) when all of the primitives that are indicated as being present within a tile by the control list for the tile have been processed by the HSR logic 120, (ii) when a translucent or punch through fragment passes a depth test and overlaps a previous fragment in the tag buffer 124, (iii) when a fragment passes a depth test and overlaps a previous translucent or punch through fragment in the tag buffer 124, (iv) when the depth function changes between consecutive fragments, (v) when a depth write enable flag changes, (vi) when the object type for consecutive fragments switches from 'punch through' to 'non-punch through', or (vii) when memory that holds different primitive IDs and primitive block IDs gets full. If the tag buffer is to be flushed then the method passes to step S220, but if the tag buffer is not to be flushed then the method passes to step S219.

In step S219 the HSR logic 120 updates the depth buffer 122 and the tag buffer 124 based on the fragment that passed the depth test in step S212. That is, the HSR logic 120 updates a depth value in the depth buffer 122 at the position corresponding to the fragment to have the depth value of the fragment; and the HSR logic 120 updates a primitive ID in the tag buffer 124 at the position corresponding to the fragment to be the primitive ID of the fragment. It is noted that in some systems the depth buffer and tag buffer might not be updated in response to a fragment passing a depth test, i.e. step S219 might not be performed: this is something that can be controlled by an Application Programming Interface (API). Following step S219 the method passes back to step S204 (or to step S202 if more primitive data is to be fetched) and the method continues from there for the next primitive.

In step S220, the HSR logic 120 flushes the tag buffer 124. This means that all of the tags (i.e. primitive IDs) in the tag buffer 124 are passed to the processing logic 126.

In step S221 the HSR logic 120 updates the depth buffer 122 and the tag buffer 124 based on the fragment that passed the depth test in step S212. That is, the HSR logic 120 updates a depth value in the depth buffer 122 at the position corresponding to the fragment to have the depth value of the fragment; and the HSR logic 120 updates a primitive ID in the tag buffer 124 at the position corresponding to the fragment to be the primitive ID of the fragment. It is noted that in some systems the depth buffer and tag buffer might not be updated in response to a fragment passing a depth test, i.e. step S221 might not be performed: this is something that can be controlled by an Application Programming Interface (API). Since step S221 is performed after step S220, when a fragment that passes the depth test of step S212 causes a flush of the contents of the tag buffer 124, the fragment that caused the flush is stored in the tag buffer 124. In this way, several more fragments from the overlapping object may be gathered in the tag buffer, so that they can all be subsequently flushed together and processed in parallel by the processing logic 126 (e.g. using a SIMD shader engine).

In step S222 the processing logic 126 executes one or more shader programs for fragments that are identified by the tags (i.e. primitive IDs) that have been flushed from the tag buffer 124. Different shader programs may be executed for different fragments, e.g. if the fragments are from different objects. As described above, a user can specify the functionality of a shader program to thereby determine how the system processes fragments that are not occluded in the scene. For example, the shader program may involve applying a texture to a primitive fragment. Applying a texture would involve fetching texels of a texture and combining them (e.g. using some form of interpolation) to determine a texture value at the position of the fragment. The processing logic 126 outputs the shaded fragments, e.g. to the PBE 128.

When the shader program has been executed then the method passes to step S224 in which it is determined whether there are any more primitives to process for the current tile (i.e. whether there are any primitives identified on the tile control list for the tile which have not yet been processed by the rendering logic 106. If there is another primitive to process then the method passes back to step S204 (or to step S202 if more primitive data is to be fetched) and the method continues from there for the next primitive. If there are no more primitives to process then the method passes from step S224 to step S226.

In step S226 the shaded fragments are used to determine a rendered image of the scene. In this way, the results of processing the fragments are used to render an image of a scene. In a first example, the shaded fragments may represent rendered pixel values of an image of the scene. In a second example, the pixel back end (PBE) 128 may apply some further processing to the shaded fragments in order to determine the rendered pixel values of the image of the scene. For example, the PBE 128 may apply a transformation, colour space conversion or blending operation, e.g. to combine shaded fragments in order to determine the rendered pixel values. The rendered pixel values are output from the rendering logic 106 and stored in a frame buffer, e.g. in the memory 108.

The description above describes how opaque fragments (i.e. fragments of opaque objects) are processed by the rendering logic 106 when there are no punch through fragments in-flight. However, if the next primitive is a punch through primitive then in step S204 the rendering logic 106 (e.g. the fetch unit 116) will determine that the primitive does have a shader-dependent property. In particular, it will be determined that the primitive has shader-dependent presence, meaning that the presence of fragments of the primitive are not known until some shader code has been executed in respect of the fragments on the processing logic 126. So the method passes from step S204 to step S228 for this primitive.

In step S228 the transformed primitive data (e.g. vertex data for a transformed primitive) is passed from the fetch unit 116 to the rasterization logic 118. In step S228 the rasterization logic 118 performs rasterization (which may be referred to as "scan conversion" or "sampling") on the transformed primitive data to generate fragments at sample positions within the tile that is currently being processed in the rendering logic 106. The fragments are passed to the HSR logic 120. In step S230 the HSR logic 120 receives the fragments of the punch through primitive.

In step S232 the HSR logic 120 performs early depth tests on the fragments. As described above, a depth test involves comparing a depth value of a fragment with a depth value at a corresponding sample position from the depth buffer 122 in accordance with a depth compare mode. To give some examples, the depth compare mode may be a "less than", "less than or equal", "greater than", "greater than or equal" or "equal" depth compare mode. An "early depth test" may be referred to as a "first depth test", an "initial depth test", a "preliminary depth test" or a "conservative depth test". An early depth test is performed on a punch through fragment before a shader-dependent presence for the fragment has been determined. As such the early depth test might not be able to give a definitive answer as to whether the punch through fragment should pass the hidden surface removal stage. However, in some situations (e.g. when a punch through fragment fails a depth test with respect to a depth value stored in the depth buffer) then it is known that the punch through fragment will not be visible in the rendered image so it can be discarded (no matter what value the in-flight punch through fragment may write to the depth buffer for that pixel location in the future). It is noted that, if there are some earlier punch through fragments that are still "in-flight", i.e. that could still perform a late depth test using the depth buffer 122, the early depth test might only be performed in step S232 for fragments that have the same depth compare mode as the earlier in-flight fragments. If the depth compare mode for a fragment is not the same as that of the earlier in-flight fragments then the processing pipeline may be stalled. In this case, the processing pipeline can be unstalled (i.e. resumed) when all of the in-flight punch through fragments have completed their late depth tests/writes.

In step S234 the HSR logic 120 determines, for each fragment, whether the fragment passed the early depth test performed in step S232. If a fragment fails the early depth test then it is known that the fragment will not be visible in the rendered image, e.g. because it is occluded. As such, if a fragment fails the early depth test then it is discarded in step S236. However, if a punch through fragment passes the early depth test then it is not known whether the fragment should be discarded because that may depend upon the shader-dependent presence of the fragment. If a fragment passes the early depth test then it is not (immediately) discarded, and the method proceeds to step S237. The depth buffer 122 is not updated when a fragment passes an early depth test. This is because passing an early depth test is only a provisional depth test result.

In step S237 the HSR logic 120 determines whether the tag buffer is to be flushed. As described above in relation to step S218, in step S237 it is determined that the tag buffer is to be flushed: (i) when all of the primitives that are indicated as being present within a tile by the control list for the tile have been processed by the HSR logic 120, (ii) when a translucent or punch through fragment passes a depth test and overlaps a previous fragment in the tag buffer 124, (iii) when a fragment passes a depth test and overlaps a previous translucent or punch through fragment in the tag buffer 124, (iv) when the depth function changes between consecutive fragments, (v) when a depth write enable flag changes, (vi) when the object type for consecutive fragments switches from 'punch through' to 'non-punch through', or (vii) when memory that holds different primitive IDs and primitive block IDs gets full. If the tag buffer is to be flushed then the method passes to step S239, but if the tag buffer is not to be flushed then the method passes to step S238.

In step S238 the HSR logic 120 updates the tag buffer 124 based on the fragment that passed the early depth test in step S232. That is, the HSR logic 120 updates a primitive ID in the tag buffer 124 at the position corresponding to the fragment to be the primitive ID of the fragment. Following step S238 the method passes back to step S204 (or to step S202 if more primitive data is to be fetched) and the method continues from there for the next primitive.

In step S239, the HSR logic 120 flushes the tag buffer 124. This means that all of the tags (i.e. primitive IDs) in the tag buffer 124 are passed to the processing logic 126.

In step S240 the HSR logic 120 updates the tag buffer 124 based on the fragment that passed the early depth test in step S232. That is, the HSR logic 120 updates a primitive ID in the tag buffer 124 at the position corresponding to the fragment to be the primitive ID of the fragment.

In step S241, in response to a punch through fragment passing the early depth test and subsequently being flushed from the tag buffer 124, the processing logic 126 initiates processing of the fragment by executing one or more instructions of a shader program for the fragment. In particular, in step S241 the processing logic 126 executes enough of the instructions of the shader program to determine the presence of the fragment.

In step S242, once the shader-dependent property of the fragment has been determined then the execution of the shader program on the processing logic 126 is paused.

In step S243 the processing logic 126 determines whether the fragments have survived the execution of the one or more instructions of the shader program in step S241. If a fragment has not survived, e.g. because the execution of the instructions of the shader program have determined that the fragment is not present, then the method passes to step S244 in which the fragment is discarded. However, if a fragment has survived then the processing of that fragment continues in step S246. For example, if the execution of the instructions of the shader program has determined that a fragment is present then the processing of the fragment proceeds to step S246. If the execution of the instructions of the shader program has determined a depth value for a fragment then that depth value can be used for further processing of the fragment.

Figure 4:
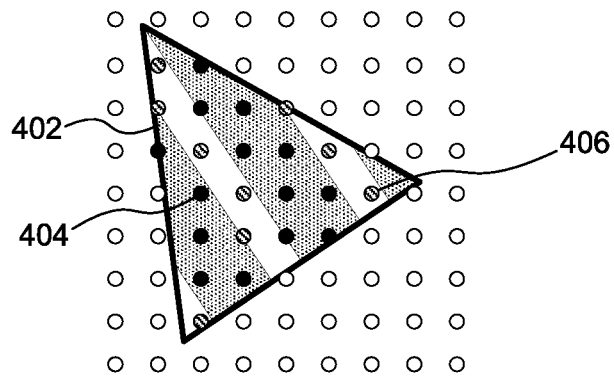
FIG. 4 shows a punch through object positioned within an array of sample positions of a rendering space.

FIG. 4 illustrates a punch through primitive 402 positioned within an array of sample positions of a rendering space. The sample positions are represented as circles in FIG. 4. The one or more instructions of the shader program are executed for the fragments of the primitive 402 in step S241. The fragments of the primitive 402 are positioned where the primitive 402 overlaps with the sample positions. The one or more instructions of the shader program includes a discard instruction, the execution of which is conditional on applying a texture to the fragment and using the alpha value of the texture to determine whether or not to discard the fragment. The texture, as applied to the primitive 402, is represented by the clear and dark strips on the primitive 402, wherein the clear strips represent holes in the primitive and the dark strips represent opaque portions of the primitive. This texture could, for example, be used to represent a picket fence in a scene. Fragments of the primitive 402 which are determined to be present (e.g. fragment 404), because the primitive is opaque at the corresponding sample positions, are shown as black circles in FIG. 4. Fragments of the primitive 402 which are determined to be not present (e.g. fragment 406), because the primitive has a hole at the corresponding sample positions, are shown as circles with diagonal hatching in FIG. 4.

Returning to the flow chart in FIGS. 2a and 2b, in step S246 the HSR logic 120 performs late depth tests on the surviving fragments. As described above, a depth test involves comparing a depth value of a fragment with a depth value at a corresponding sample position from the depth buffer 122 in accordance with a depth compare mode. A "late depth test" may be referred to as a "second depth test", a "subsequent depth test", a "final depth test" or a "conclusive depth test". A late depth test is performed on a fragment after a shader-dependent property for the fragment has been determined. As such the late depth test gives a definitive answer as to whether the fragment should pass the hidden surface removal stage. Unlike with an early depth test, when a fragment passes a late depth test the depth buffer 122 may be updated. This is because passing a late depth test provides a 'conclusive' or 'final' depth test result.

In step S248 the HSR logic 120 determines, for each fragment, whether the fragment passed the late depth test performed in step S246. If a fragment fails the late depth test then it is known that the fragment will not be visible in the rendered image, e.g. because it is occluded. As such, if a fragment fails the late depth test then it is discarded in step S250, and any resources used for tracking the punch through fragment can be freed. If a fragment passes the late depth test then it is not discarded, and the method proceeds to step S252.

In step S252 the HSR logic 120 updates the depth buffer 122 (but not the tag buffer 124). That is, for each fragment that passed the late depth test, the HSR logic 120 updates a depth value in the depth buffer 122 at the position corresponding to the fragment to have the depth value of the fragment.

In step S254 the execution of the shader program for the fragment is resumed, from where it had been paused in step S242. In other words, in response to the fragment passing the late depth test, a further one or more instructions of the shader program are executed for the fragment on the processing logic 126. In other examples, rather than pausing the execution of the shader program in step S242 and resuming the execution of the shader program in step S254, the execution of the shader program could be ended in step S242 and then in step S254 the whole shader program (including the one or more instructions that were executed in step S238) could be executed. These other examples would result in more work for the processing logic, but they would mean that the processing logic 126 did not need to store any state data for the paused execution of the shader program.

After the shader program has been executed then the method passes from step S254 to step S224 in which, as described above, it is determined whether there are any more primitives to process for the current tile.

If a fragment is discarded (in step S216, S236, S244 or S250) the processing of that fragment ceases, and the rendering logic 106 proceeds by processing other fragments.

Whilst punch through fragments are 'in-flight', i.e. from the time that a punch through object is received by rasterization logic 118 up until all its alpha-test-surviving fragments have performed the late depth test, the processing of any incoming non-punch through objects is stalled, but the processing of any incoming punch-through objects is not stalled. This is so that the depth values in the depth buffer 122 are valid for all of the depth tests that are performed using the depth buffer 122. So if a primitive that does not have a shader-dependent property is ready to be processed, but there are some in-flight fragments which could cause a late depth write to the depth buffer 122, then the method will pass from step S206 to step S256. In step S256 the pipeline of the rendering unit 106 stalls in respect of the current primitive until there are no in-flight fragments which could cause a late depth write to the depth buffer 122. When all of the in-flight fragments that could cause a late depth write to the depth buffer 122 have been processed then the contents of the depth buffer are ready to be used for processing fragments of the current primitive, so the pipeline is unstalled and the method passes from step S256 to step S208 and the processing of the current primitive continues from that point in the flow chart as described above.

In the flow chart shown in FIGS. 2a and 2b, the stalling of the pipeline (in step S256) happens before rasterization (in step S208). At this point in the pipeline it is objects (e.g. primitives) that are stalled because they have not yet been broken down into fragments by the rasterization logic 118. As an alternative, the stalling of the pipeline could happen after rasterization but before depth tests are performed on the fragments of the current primitive. Either way, the stalling of the pipeline occurs before depth tests are performed on non-punch through fragments (in step S212).

Furthermore, in the flow chart shown in FIGS. 2a and 2b, the rasterization of the primitives to generate fragments (in step S208 or S228) is performed after the determinations in steps S204 and S206. As an alternative, the rasterization of the primitives to generate fragments could be performed before one or both of the determinations in steps S204 and S206.

As described above, the primitives (and therefore the fragments) are ordered according to a submission order, and the primitives (and fragments) are processed in accordance with the submission order. This is because switching the order in which overlapping primitives are processed by the rendering logic 106 could affect the final rendered values (e.g. for non-opaque fragments or when the depth compare mode changes). As such, when a non-punch through object is received while fragments of a previous punch through object are in-flight, the pipeline stalls until the depth of the in-flight punch through fragments has been resolved, and any late depth tests/writes to the depth buffer have been made. The stalling of the pipeline introduces latency into the system, which may starve the processing logic 126 of work. This can render the architecture unable to hide the large latency of certain pipelined operations like fetching textures from external memory, thereby reducing the performance of the graphics processing system 100.

Figure 3A:
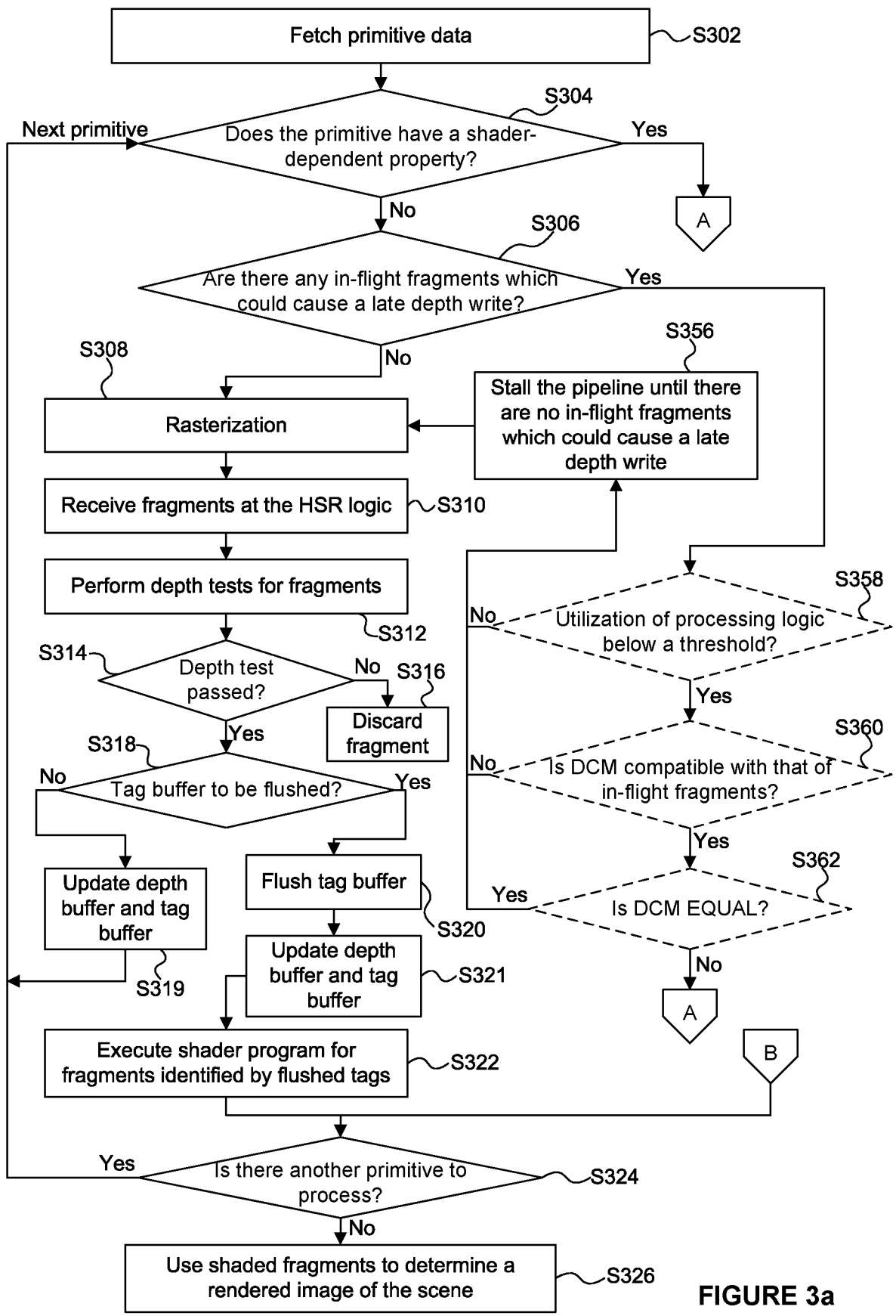
FIGS. 3a and 3b show a flow chart for a second method of processing fragments in a graphics processing system.
Figure 3B:
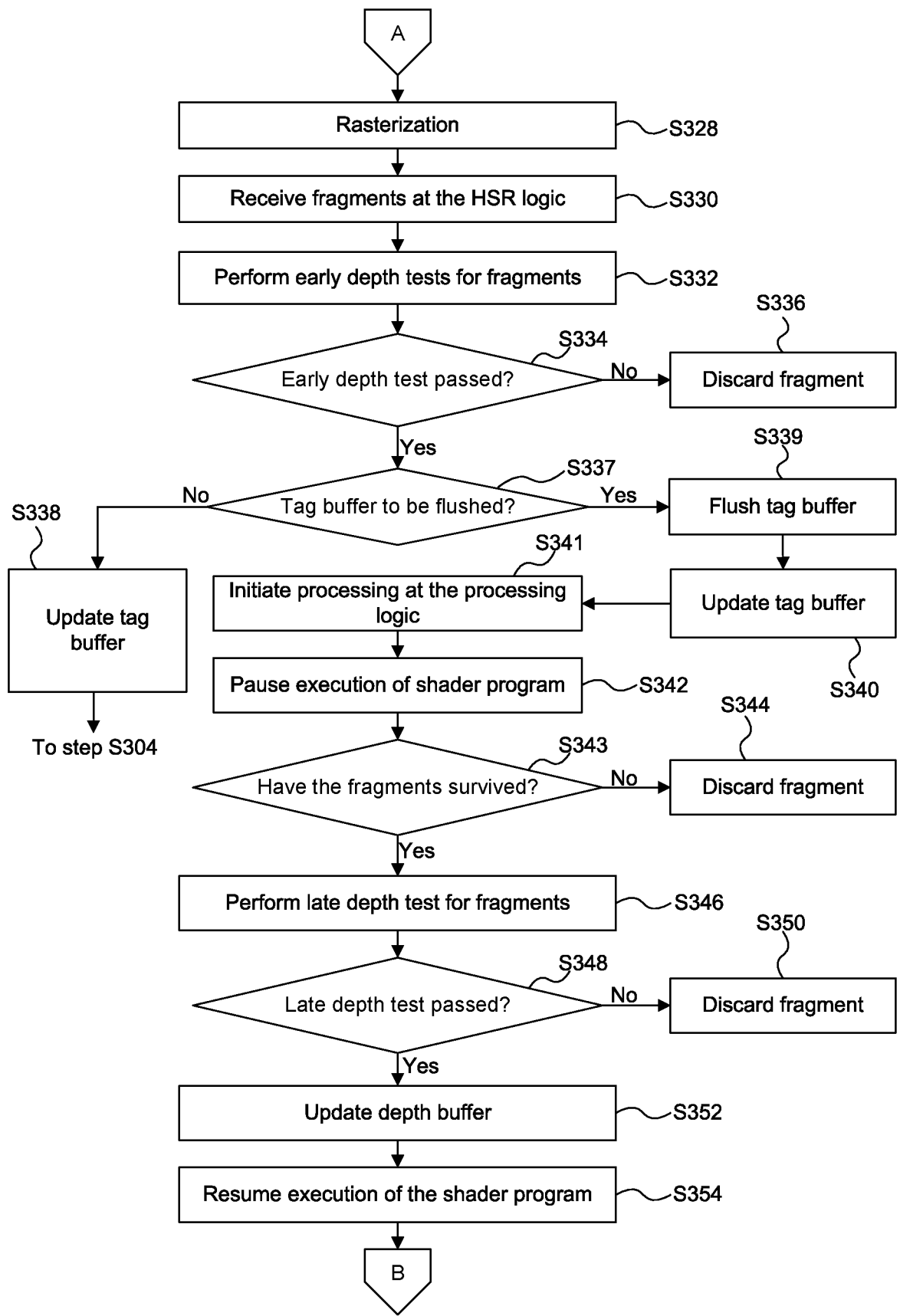

FIGS. 3a and 3b show a flow chart for a method that can avoid stalling the pipeline in situations where the pipeline in the method shown in FIGS. 2a and 2b would stall. The method shown in FIGS. 3a and 3b is very similar to the method shown in FIGS. 2a and 2b. In fact steps S302 to S356 of the flow chart in FIGS. 3a and 3b may be the same as the respective steps S202 to S256 in FIGS. 2a and 2b (apart from any differences mentioned below), and for conciseness the description of these steps in situations where it is the same as in FIGS. 2a and 2b is not repeated here for the method shown in FIGS. 3a and 3b. However, in the flow chart of FIGS. 3a and 3b, when a primitive does not have a shader-dependent property (i.e. the determination in step S304 is 'No' such that the method passes to step S306) and when there are some in-flight fragments which could perform a late depth test, e.g. and possibly cause a late depth write (i.e. the determination in step S306 is 'Yes'), then the method does not pass straight from step S306 to step S356, and the pipeline does not (necessarily) stall. Instead, the primitive may be treated as a pseudo-punch through primitive, meaning that it is treated as if it were a punch through primitive, and the method may pass to step S328 such that an early depth test is performed on the pseudo-punch through fragments (i.e. the fragments of the pseudo-punch through primitive). In between steps S306 and S328 there may be some optional, additional steps: steps S358, S360 and S362 which are decisions based on further factors which can be used to determine whether to treat the non-punch through primitive as a pseudo-punch through primitive, i.e. whether to proceed to step S328 (as for punch through primitives) or to proceed to step S356 (as for non-punch through primitives in the flow chart shown in FIGS. 2a and 2b). Steps S358, S360 and S362 are shown with dashed lines in FIG. 3a to indicated that they are optional steps.

In the method shown in FIGS. 3a and 3b, rather than stalling the pipeline when a non-punch through primitive (i.e. a primitive which does not have a shader-dependent property) is received whilst fragments of a punch through primitive are still in-flight, processing of the non-punch through primitive can be performed. In particular, in step S328 the rasterization logic 118 performs rasterization on the non-punch through primitive to generate fragments, which are passed to, and received by, the hidden surface removal logic 120 (in step S330). These fragments do not have a shader-dependent property, but they are treated as if they do have a shader-dependent property by the hidden surface removal logic 120. As such, in step S332 the hidden surface removal logic 120 performs early depth tests on the fragments by comparing the depth values of the fragments with depth values in the depth buffer 122.

The early depth test is a conservative depth test because not all of the relevant depth information is known at the time that the early depth test is performed on a fragment for a complete depth test to be performed, but in some situations enough information may be known to discard the fragment. In other words, the early depth test is conservative meaning that the results of the early depth test can include false positives but never false negatives. A 'false positive' result would be if a fragment passes an early depth test even though it would fail a full, late depth test. A 'false negative' result would be if a fragment fails an early depth test even though it would pass a full, late depth test. In the example described above of an early depth test being performed on a punch through fragment (with reference to the flow chart shown in FIGS. 2a and 2b), the presence of the punch through fragments being tested is not known at the time that the early depth test is performed. In contrast, in the example described with reference to FIGS. 3a and 3b, when an early depth test is performed on a pseudo-punch through fragment (i.e. a fragment of a non-punch through primitive which is being treated as if it were a fragment of a punch through primitive) the presence of the pseudo-punch through fragment may be known but the depth values in the depth buffer cannot be fully relied upon because they may be updated by preceding fragments which are in-flight. However, it may be known that any update to the depth values in the depth buffer from preceding in-flight fragments can only increase or only decrease the depth values in the depth buffer, depending on the depth compare mode. For example, if a 'less than' or a 'less than or equal' depth compare mode is used then any updates cannot increase the depth values in the depth buffer, so if the current fragment (on which an early depth test is being performed) has a depth value that is greater than a depth value in the depth buffer at a position corresponding to the current fragment then it is known that the current fragment would fail a full depth test (i.e. a depth test performed after any updates to the depth buffer from in-flight fragments), and so the current fragment can be discarded in step S336. As another example, if a 'greater than' or a 'greater than or equal' depth compare mode is used then any updates cannot decrease the depth values in the depth buffer, so if the current fragment (on which an early depth test is being performed) has a depth value that is less than a depth value in the depth buffer at a position corresponding to the current fragment then it is known that the current fragment would fail a full depth test (i.e. a depth test performed after any updates to the depth buffer from in-flight fragments), and so the current fragment can be discarded in step S336.

If a pseudo-punch through fragment passes the early depth test then the method passes to step S337. The depth buffer 122 is not updated when a fragment passes an early depth test. This is because passing an early depth test is only a provisional depth test result.

In step S337 the HSR logic 120 determines whether the tag buffer is to be flushed. As described above in relation to step S237, in step S337 it is determined that the tag buffer is to be flushed: (i) when all of the primitives that are indicated as being present within a tile by the control list for the tile have been processed by the HSR logic 120, (ii) when a translucent or punch through fragment passes a depth test and overlaps a previous fragment in the tag buffer 124, (iii) when a fragment passes a depth test and overlaps a previous translucent or punch through fragment in the tag buffer 124, (iv) when the depth function changes between consecutive fragments, (v) when a depth write enable flag changes, (vi) when the object type for consecutive fragments switches from 'punch through' to 'non-punch through', or (vii) when memory that holds different primitive IDs and primitive block IDs gets full. If the tag buffer is to be flushed then the method passes to step S339, but if the tag buffer is not to be flushed then the method passes to step S338.

In step S338 the HSR logic 120 updates the tag buffer 124 based on the fragment that passed the depth test in step S332. That is, the HSR logic 120 updates a primitive ID in the tag buffer 124 at the position corresponding to the fragment to be the primitive ID of the fragment. Following step S338 the method passes back to step S304 (or to step S302 if more primitive data is to be fetched) and the method continues from there for the next primitive.

In step S339, the HSR logic 120 flushes the tag buffer 124. This means that all of the tags (i.e. primitive IDs) in the tag buffer 124 are passed to the processing logic 126.

In step S340 the HSR logic 120 updates the tag buffer 124 based on the fragment that passed the depth test in step S332. That is, the HSR logic 120 updates a primitive ID in the tag buffer 124 at the position corresponding to the fragment to be the primitive ID of the fragment.

In step S341, in response to a punch through fragment passing the early depth test and subsequently being flushed from the tag buffer 124, the processing logic 126 initiates processing of the fragment, e.g. by executing zero or more instructions of a shader program for the fragment. The initiation of the processing of the fragment in step S341 determines that a late depth test is to be performed on the fragment. For example, the initiation of the processing in step S341 may include executing an instruction (e.g. the first instruction of the shader program) that causes a late depth test to be performed on the fragment. As another example, step S341 might not involve executing any instructions of a shader program, and instead may for example involve reading a flag which indicates that a late depth test is to be performed on the fragment. The pseudo-punch through fragment does not have a shader-dependent property so there is no need to determine a property (e.g. the presence) of the pseudo-punch through fragment in step S341.

In step S342, in response to determining that a late depth test is to be performed on the pseudo-punch through fragment, the execution of the shader program for the pseudo-punch through fragment is paused. In this example, the shader program will be paused while a late depth test is performed on the pseudo-punch through fragment with the hidden surface removal logic 120.

The initiation of the processing at the processing logic in step S341 in respect of pseudo-punch through fragments will not usually cause any of the fragments to be discarded, such that in step S343 it is determined that the pseudo-punch through fragments have survived the initiation of the processing at the processing logic in step S341. As such the method passes to step S346 in which a late depth test is performed on the pseudo-punch through fragments with the hidden surface removal logic 120 using the depth buffer 122. In particular, the late depth test on a pseudo-punch through fragment is performed after the late depth tests are performed on any preceding fragments that were in-flight when the pseudo-punch through fragment was received at the hidden surface removal logic 120. In this way, the depth values in the depth buffer 122 can be relied upon when the late depth test is performed on the pseudo-punch through fragment.

In step S348 the hidden surface removal logic 120 determines whether each of the pseudo-punch through fragments has passed the late depth test. If a pseudo-punch through fragment fails the late depth test then in step S350 the pseudo-punch through fragment is discarded. If a pseudo-punch through fragment passes the late depth test then the method passes to step S352 in respect of that fragment. In step S352, in response to a pseudo-punch through fragment passing the late depth test, a depth value in the depth buffer is updated. For example, a depth value in a position in the depth buffer 122 corresponding to the position of the pseudo-punch through fragment can be replaced with the depth value of the pseudo-punch through fragment.

Then, in step S354 (which is performed in response to the pseudo-punch through fragment passing the late depth test), the execution of the shader program in respect of the pseudo-punch through fragment on the processing logic 126 (that was paused in step S342) is resumed. In this way, a further one or more instructions of the shader program for the pseudo-punch through fragment are executed on the processing logic 126. In other examples, rather than pausing the execution of the shader program in step S342 and resuming the execution of the shader program in step S354, the execution of the shader program could be ended in step S342 and then in step S354 the whole shader program (including the one or more instructions that were executed in step S341) could be executed. These other examples would result in more work for the processing logic, but it would mean that the processing logic 126 did not need to store any state data for the paused execution of the shader program.

After step S354 the method proceeds to step S324 (which is the same as step S224 described above) in which it is determined whether there are any more primitives to process.

It can be seen that the method shown in FIGS. 3a and 3b can allow fragments, which do not have any shader-dependent properties and which are received when there are some in-flight fragments which could perform a late depth test, e.g. which could cause a late depth write (i.e. a write to the depth buffer 122 resulting from passing a late depth test), to be processed (rather than stalling the pipeline). Not stalling the pipeline can provide a benefit in terms of reducing the latency in the pipeline and increasing the performance of the graphics processing system 100.

Primitives can follow one another down the pipeline such that there may be multiple primitives at different stages within the pipeline at any given time (e.g. in the rasterization logic 118, the HSR logic 120 and in the processing logic 126). If the fragments of a pseudo-punch through primitive fail the early depth tests in step S332 then they can be discarded (in step S336) and subsequent fragments of other primitives can continue to be processed (which is not possible in the method shown in FIGS. 2a and 2b).

In some situations, when a primitive is received at the rasterization logic 118, which does not have a shader-dependent property, whilst there are some in-flight fragments which perform a late depth test, e.g. which could cause a late depth write to the depth buffer 122 (i.e. the answer to step S304 is 'No' and the answer to step S306 is 'Yes'), it might be considered beneficial to stall the pipeline (i.e. pass to step S356) rather than treat the new primitive as a pseudo-punch through primitive (i.e. rather than passing to step S328). Therefore, in some examples, one or more of steps S358, S360 and S362 could be implemented, as explained below.

In step S358 (which is an optional step) the rendering logic 106 (e.g. the rasterization logic 118) determines a utilization indication which indicates a level of utilization of the processing logic 126. In particular, it determines whether the indicated level of utilization of the processing logic 126 is below a threshold level of utilization. If the indicated level of utilization of the processing logic 126 is not below the threshold level of utilization then the method passes to step S356 in which the pipeline stalls. However, if the indicated level of utilization of the processing logic 126 is below the threshold level of utilization then the method can proceed to step S328 by treating the primitive as a pseudo-punch through primitive (if steps S360 and S362 are not implemented), or the method can proceed to step S360 or S362 if those steps are implemented in the method. By implementing step S358 between steps S306 and S328 it means that the early depth tests (in step S332) are performed on fragments which do not have a shader-dependent property in response to determining that the indicated level of utilization of the processing logic is below the threshold level of utilization.

Implementing step S358 can provide a benefit because one significant advantage of treating non-punch through objects as pseudo-punch through objects is to avoid the processing logic 126 being starved of work whilst the pipeline waits for feedback in relation to a late depth test on punch through fragments. Therefore, if the processing logic 126 would not be starved of work due to a stall in the pipeline (e.g. if it has other work to process, e.g. from other tiles which may be being rendered concurrently) then there is less benefit in treating non-punch through objects as pseudo-punch through objects. The threshold level of utilization can be set in step S358 so that non-punch through objects are treated as pseudo-punch through objects only if this will avoid a situation in which the processing logic 126 is starved of work. The processing logic 126 can be said to be 'starved of work' when its efficiency reduces due to a lack of work for it to carry out.

The utilization of the processing logic 126 is a dynamic property, i.e. it changes over time as the graphics processing system 100 processes graphics data. An indication of the utilization of the processing logic 126 may be based on one or more factors, e.g.: (i) a state of a task queue which holds pending tasks to be processed by the processing logic 126, (ii) a number of instructions that are still to be executed in one or more shader programs that are currently being executed by the processing logic 126, (iii) a number of tasks that have been mapped to an execution slot on the processing logic 126 which are enabled and potentially running or are paused waiting for something, such as a texture fetch, and/or (iv) a number of tasks that will be created and passed to the processing logic 126 to be processed when the tag buffer 124 is flushed. In other examples, the utilization indication could be based on other factors in addition or as an alternative to the examples mentioned above.

For example, the contents of the tag buffer can be analysed to forecast a fragment workload (e.g. a number of tasks to be executed by the processing logic 126) that will be created when the tag buffer is flushed. For example, the processing logic 126 may be running low on work but there may be a significant number of fragments in the tag buffer indicating that the processing logic 126 is likely to have more work in the near future (when the tag buffer gets flushed).

Furthermore, checking how much more code is left to execute in the tasks that are resident in the processing logic 126 and are executing or are being paused will give an appreciation of not only how many tasks are running but also how much work they have left to do.

The above indicators of workload pending in the various pipeline stages may be combined with statistics gathered in real time in order to get a more accurate view of the utilisation of the processing logic 126 now and in the near future. For example a real-time statistic indicating 'average quads active in a task' may be determined from previous tag buffer flushes, which can be used to estimate how many tasks a tag buffer will generate when it gets flushed in the future based on how many quads are currently active (i.e. have a fragment in them) in it. A "quad" is 2×2 block of pixels. These statistics can be refined by using qualified versions of them, for example 'average quads active in a task with X primitives in it'.

In step S360 (which is an optional step) the rendering logic 106 (e.g. the rasterization logic 118) determines whether the depth compare mode (DCM) of fragments of the current object is compatible with the DCM of the in-flight fragments. The "current object" here refers to the object which does not have any shader-dependent properties but which may be treated as a pseudo-punch through object because there are in-flight fragments which could cause a late depth write to the depth buffer 122. A first DCM is "compatible" with a second DCM if the two DCMs are the same as each other. Furthermore, a 'less than' DCM and a 'less than or equal to' DCM are compatible with each other; and a 'greater than' DCM and a 'greater than or equal to' DCM are compatible with each other. If the DCM of fragments of the current object is not compatible with the DCM of the in-flight fragments then the method passes to step S356 in which the pipeline stalls. However, if the DCM of fragments of the current object is compatible with the DCM of the in-flight fragments then the method can proceed to step S328 by treating the primitive as a pseudo-punch through primitive (if step S362 is not implemented), or the method can proceed to step S362 if that step is implemented in the method. By implementing step S360 between steps S306 and S328 it means that the early depth tests (in step S332) are performed on fragments which do not have a shader-dependent property in response to determining that fragments of the current object and the in-flight fragments which could cause a late depth write to the depth buffer 122 have compatible depth compare modes.

In response to determining that the DCM of fragments of a current object are not compatible with the DCM of in-flight fragments, as an alternative to stalling the pipeline, the object could still be treated as a pseudo-punch through object but the early depth test for fragments of this object (in step S332) could be bypassed.

In step S362 (which is an optional step) the rendering logic 106 (e.g. the rasterization logic 118) determines whether the depth compare mode (DCM) of fragments of the current object is the 'equal' DCM. If the DCM of fragments of the current object is the 'equal' DCM then the method passes to step S356 in which the pipeline stalls. However, if the DCM of fragments of the current object is not the 'equal' DCM then the method can proceed to step S328 by treating the primitive as a pseudo-punch through primitive. By implementing step S362 between steps S306 and S328 it means that the early depth tests (in step S332) are performed on fragments which do not have a shader-dependent property in response to identifying that the depth compare mode of fragments of the current object is not an 'equal' depth compare mode. An early depth test would not be able to discard fragments which have an 'equal DCM' because the values in the depth buffer may change after the early depth test due to preceding in-flight fragments. As such, if primitives having an 'equal' DCM were treated as pseudo-punch through primitives then all of those primitives would be processed by the processing logic 126. Therefore, rather than treating primitives having an 'equal' DCM as pseudo-punch through primitives, it may be beneficial to stall the pipeline. This is because stalling the pipeline for primitives which have an 'equal' DCM can reduce the number of fragments which have to be processed by the processing logic 126.

A potential drawback of treating primitives which do not have a shader-dependent property as if they do have a shader-dependent property is that, so long as there are some 'in-flight' fragments that could cause a late depth write to the depth buffer 122, when primitives which do not have a shader-dependent property are received they are treated as if they do have a shader-dependent property, thereby creating more 'in-flight' fragments which could cause a late depth write to the depth buffer 122. In this way, a punch through mode for processing primitives may be considered to be "stuck". In other words, making objects pseudo-punch through objects perpetuates the situation where we have to make future objects pseudo-punch through objects too (given that we spend more time with punch through or pseudo-punch through fragments in flight). The steps involved in processing primitives which do not have a shader-dependent property as if they do have a shader-dependent property are not as efficient (in terms of latency and power consumption) as the steps involved in processing primitives which do not have a shader-dependent property as if they do not have a shader-dependent property. In particular the early depth test in step S332 is not as effective at culling hidden surfaces as the depth test in step S312, so more fragments are passed to the processing logic 126 for processing when primitives are processed as if they have a shader-dependent property. Furthermore, when a primitive is treated as though it does not have a shader-dependent property then a single depth test is performed on each fragment of the primitive, but when a primitive is treated as though it has a shader-dependent property then two depth tests (an early depth test and a late depth test) are performed on each surviving fragment of the primitive. So it is beneficial to "unstick" the punch through mode as soon as possible. In other words, as soon as there are no in-flight punch through fragments (i.e. no real punch through fragments, not including pseudo-punch through fragments, in-flight) which could perform a late depth test, e.g. which could cause a late depth write to the depth buffer 122, then the system can stop treating incoming primitives which do not have a shader-dependent property as if they do have a shader-dependent property.

In the example shown in FIGS. 3*a* and 3*b*, the step of determining that there is at least one preceding fragment for which a late depth test is still to be performed which could cause an update to a depth value in the depth buffer 122 (i.e. step S306) is performed in response to fetching primitive data for a primitive which does not have a shader-dependent property, and the step of performing rasterization on that primitive in step S328 is performed in response to determining that there is at least one preceding fragment for which a late depth test is still to be performed which could cause an update to a depth value in the depth buffer. However, in other examples, the rasterization of the primitives to generate fragments could be determined before it is determined whether there is at least one preceding fragment for which a late depth test is still to be performed which could cause an update to a depth value in the depth buffer 122. However, in both of these examples, the step of determining whether there is at least one preceding fragment for which a late depth test is still to be performed which could cause an update to a depth value in the depth buffer 122 is performed before fragments of the current primitive are processed, i.e. before performing a depth test in step S312 or performing an early depth test in step S332.

In the example shown in FIGS. 3*a* and 3*b*, the "stickiness" of the punch through mode (i.e. the determination of whether there is at least one preceding fragment for which a late depth test is still to be performed which could cause an update to a depth value in the depth buffer 122) is performed for each incoming primitive to be processed. In other words, the decision of whether to treat the fragments of a primitive which does not have a shader-dependent property as though it does have a shader-dependent property is made at the granularity of primitives (or "objects"). In other examples, this decision could be made at a different granularity, e.g. at a finer granularity, such as at the granularity of fragments or blocks (e.g. quads) of fragments, or at a coarser granularity, such as at the granularity of groups of objects, e.g. "primitive blocks".

One way to make the decision at the granularity of fragments would be to store, for each of a plurality of depth values in the depth buffer 122, an in-flight indication to indicate whether there are any preceding fragments for which a late depth test is still to be performed using (i.e. "accessing") that depth value in the depth buffer, e.g. which could cause an update to that depth value in the depth buffer. These "in-flight indications" may be referred to as "dirty bits" because they indicate whether the depth value is "clean", i.e. it will not be altered by any in-flight fragments, or "dirty", i.e. it can be altered by one or more in-flight fragments. Then when the rendering logic 106 (e.g. the hidden surface removal logic 120) comes to process a fragment, it can determine whether the in-flight indication (or "dirty bit") for the depth value in the depth buffer 122 at a position corresponding to the fragment indicates that there are any preceding fragments for which a late depth test is still to be performed which could cause an update to that depth value in the depth buffer 122. The in-flight indications can be used such that if the in-flight indication for the depth value in the depth buffer 122 is set to 'dirty' then a non-punch through fragment is processed as a pseudo-punch through fragment, but if the in-flight indication for the depth value in the depth buffer 122 is set to 'clean' then the non-punch through fragment is processed as a non-punch through fragment. In other words, the fragment can be processed as a pseudo-punch through fragment (e.g. the processing shown in FIG. 3b can be performed on the fragment including performing the early depth test on the fragment with the hidden surface removal logic 120 using the depth buffer 122 in step S332) in response to determining that the in-flight indication (or "dirty bit") for the depth value in the depth buffer at the position corresponding to the fragment indicates that there is at least one preceding fragment for which a late depth test is still to be performed which could cause an update to that depth value in the depth buffer 122. In contrast, the fragment can be processed as a non-punch through fragment (e.g. with a single depth test in step S312) in response to determining that the in-flight indication (or "dirty bit") for the depth value in the depth buffer at the position corresponding to the fragment indicates that there are no preceding fragments for which a late depth test is still to be performed which could cause an update to that depth value in the depth buffer 122. By making this decision at the granularity of fragments it allows more fragments to be treated as non-punch through fragments which is a more efficient way to process fragments. In other words, when a pixel location in the depth buffer is marked as 'dirty' the early depth test for a punch through or pseudo-punch through fragment at that position is disabled (i.e. the fragment is stored in the tag buffer). This means that there are punch through or pseudo-punch through fragments (that have late depth test enabled) in flight for this pixel location. The dirty bit on a pixel location of the depth buffer can only be cleared when all the punch through and pseudo-punch through fragments in-flight have done their late depth test. The number of late depth tests in-flight can be tracked with a reference counter for the dirty "bit" of the depth-buffer pixel location. The dirty counter increments when a punch through fragment or pseudo-punch through fragment goes through that pixel location and decrements when that fragment does its late depth test. If a fragment does not survive the discard instruction in the shader code then feedback is sent to the HSR logic in order to inform it to free resources/IDs associated with that fragment. Along with that feedback the HSR logic can be told to decrement the dirty counter for the fragments that got discarded.

Furthermore, in some examples, for each of the depth values in the depth buffer for which there is at least one preceding fragment for which a late depth test is still to be performed which could cause an update to that depth value in the depth buffer, a depth compare mode indication can be stored to indicate a depth compare mode for said at least one fragment for which a late depth test is still to be performed, e.g. which could cause an update to that depth value in the depth buffer. Then step S360 could be performed on the granularity of fragments. In other words, the decision of whether to treat a non-punch through fragment as a pseudo-punch through fragment could be made based on determining whether the depth compare mode of the fragment is compatible with the depth compare mode indicated by the depth compare mode indication for the depth value in the depth buffer at a position corresponding to the fragment. The fragment can be processed as a pseudo-punch through fragment (e.g. the processing shown in FIG. 3b can be performed on the fragment including performing the early depth test on the fragment with the hidden surface removal logic 120 using the depth buffer 122 in step S332) in response to determining that the depth compare mode of the fragment is compatible with the depth compare mode indicated by the depth compare mode indication for the depth value in the depth buffer at a position corresponding to the fragment. In contrast, the fragment can be processed as a non-punch through fragment (e.g. with a single depth test in step S312) in response to determining that the depth compare mode of the fragment is not compatible with the depth compare mode indicated by the depth compare mode indication for the depth value in the depth buffer at a position corresponding to the fragment. The depth compare mode indication is stored as extra information with the dirty bit described in the preceding paragraph. When the dirty bit for a pixel position indicates that the pixel position is 'dirty' then the depth compare mode indication will indicate whether all the inflight fragments are of a particular depth function (which would be useful for performing conservative depth tests) or of mixed depth functions (which means that conservative depth tests could not be performed).

In some examples, as mentioned above with reference to step S360, in response to determining that the DCM of fragments of a current object are not compatible with the DCM of in-flight fragments, as an alternative to stalling the pipeline, the object could still be treated as a pseudo-punch through object but the early depth test for fragments of this object (in step S332) could be bypassed. In these examples, a determination as to whether to perform the early depth test for a fragment can be based on the depth compare mode indication for the depth value in the depth buffer at a position corresponding to the fragment. In these examples, the dirty bit for a fragment can be used to determine whether to treat a non-punch through fragment as a pseudo-punch through fragment and the depth compare mode indication for a fragment can be used to determine whether to do an early depth test. For example, if the dirty bit is set to 'dirty' and the depth compared mode indication is set to 'incompatible' then a non-punch through fragment can processed as a pseudo-punch through fragment but the early depth test is disabled. As another example, if the dirty bit is set to 'dirty' and the depth compared mode indication is set to 'compatible' then a non-punch through fragment can processed as a pseudo-punch through fragment and the early depth test is enabled.

In some examples, the rendering logic 106 may comprise an alternative depth buffer in addition to the depth buffer 122. The alternative depth buffer could be used for the early depth tests performed by the hidden surface removal logic 120 on opaque fragments which are being treated as pseudo-punch through fragments in step S332. In this way, opaque punch through fragments and opaque pseudo-punch through fragments can be resolved against each other using the alternative depth buffer. In this case when early depth tests are performed then the depth tests may be performed with respect to both the primary depth buffer and the alternative depth buffer, and if a fragment fails a depth test with respect to either of the depth buffers then the fragment is discarded. Alternatively, rather than performing two depth tests for each fragment, the depth values in the alternative depth buffer could be consolidated with the depth values in the primary depth buffer whenever the depth values in the primary depth buffer are updated. In a 'less than' or 'less than or equal to' depth compare mode then "consolidating" the alternative depth buffer would mean comparing each of the depth values in the alternative depth buffer with the respective corresponding depth value in the primary depth buffer, and if the depth value in the primary depth buffer is less than the depth value in the alternative depth buffer, replacing the depth value in the alternative depth buffer with the corresponding depth value in the primary depth buffer. However, in a 'greater than' or 'greater than or equal to' depth compare mode then "consolidating" the alternative depth buffer would mean comparing each of the depth values in the alternative depth buffer with the respective corresponding depth value in the primary depth buffer, and if the depth value in the primary depth buffer is greater than the depth value in the alternative depth buffer, replacing the depth value in the alternative depth buffer with the corresponding depth value in the primary depth buffer. When the alternative depth buffer is initialized, it may have a copy of the depth values from the primary depth buffer. Using an alternative depth buffer as described in this paragraph can reduce the number of fragments which have to be processed by the processing logic because more fragments can be discarded by the early depth tests.

GPUs can be designed with the aim of optimizing (e.g. in terms of reducing the size of the hardware, reducing the power consumption and/or increasing the processing performance) the way in which the GPU processes typical graphics workloads and other types of workloads which can benefit from highly-parallelized processing. Therefore, many of the logic blocks and units in a GPU can be implemented in dedicated hardware, e.g. using fixed-function circuitry, rather than being implemented in software. Hardware implementations tend to provide higher processing performance (e.g. reduced latency) than software implementations. However, hardware implementations are inflexible in the sense that once they have been manufactured their functionality is difficult to adjust. A good trade-off can be found in the rendering logic 106 of the GPU 102 by implementing the rasterization logic 118 and the HSR logic 120 in fixed-function hardware, since the desired function of these logic block does not tend to vary, but the shader programs can be implemented in software which is executed on the processing logic 126 (where the processing logic 126 may be a SIMD processing unit) to allow flexibility in the functionality implemented by the shader programs.

As mentioned above, the examples described in detail above relate to fragments which have shader-dependent presence. However, more generally, corresponding techniques could be used to process fragments which have shader-dependent properties. The shader dependent properties are dependent upon the execution of the shader program and are relevant for the processing performed by the hidden surface removal logic. Another example of a shader-dependent property is shader-dependent depth. In particular, a fragment may have a shader-dependent depth, which means that the depth of the fragment can be altered by the execution of the shader program. These fragments can be processed in a similar manner to the way in which fragments with shader-dependent presence (i.e. "punch through fragments") are processed in the examples described in detail above. In particular, when processing a fragment with shader-dependent depth, the rendering logic 106 can make use of the same double depth test loop as described above (i.e. involving an early depth test and a late depth test), but with some precautions to ensure that the early depth test is always passed. A shader program to be executed for a fragment with shader-dependent depth may include an instruction for modifying the depth of a fragment. When the depth of the fragment has been determined then the late depth test can be performed at the HSR logic, based on the known depth of the fragment. If the fragment survives the late depth test then the rest of the shader program can be executed, and the result of the execution of the second stage of the shader program (i.e. the shaded fragment) can be used to determine a rendered value which can then be output to a memory.

Figure 5:
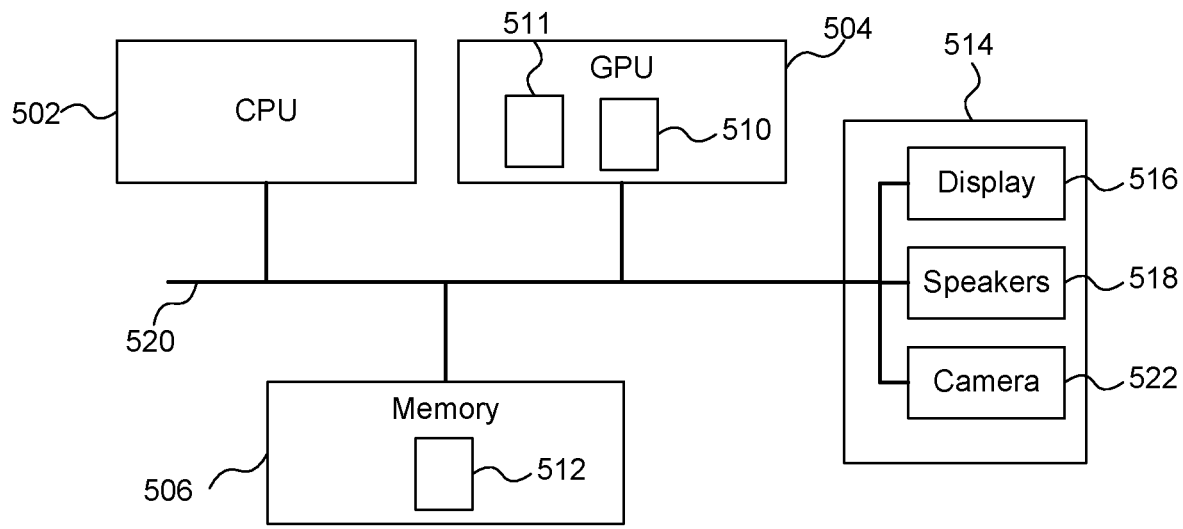
FIG. 5 shows a computer system in which a graphics processing system is implemented.

FIG. 5 shows a computer system in which the graphics processing systems described herein may be implemented. The computer system comprises a CPU 502, a GPU 504, a memory 506 and other devices 514, such as a display 516, speakers 518 and a camera 522. A processing block 510 (corresponding to a combination of the geometry processing logic 104 and the rendering logic 106) is implemented on the GPU 504, as well as a Neural Network Accelerator (NNA) 511. In other examples, the processing block 510 may be implemented on the CPU 502 or within the NNA 511. The components of the computer system can communicate with each other via a communications bus 520. A store 512 (corresponding to memory 108) is implemented as part of the memory 506.

While FIG. 5 illustrates one implementation of a graphics processing system, it will be understood that a similar block diagram could be drawn for an artificial intelligence accelerator system—for example, by replacing either the CPU 502 or the GPU 504 with a Neural Network Accelerator (NNA) 511, or by adding the NNA as a separate unit. In such cases, again, the processing block 510 can be implemented in the NNA.

The graphics processing unit 102 of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a graphics processing unit need not be physically generated by the graphics processing unit at any point and may merely represent logical values which conveniently describe the processing performed by the graphics processing unit between its input and output.

The graphics processing units described herein may be embodied in hardware on an integrated circuit. The graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a graphics processing unit configured to perform any of the methods described herein, or to manufacture a graphics processing unit comprising any apparatus described herein. An integrated circuit definition dataset may be, for example, an integrated circuit description.

Therefore, there may be provided a method of manufacturing, at an integrated circuit manufacturing system, a graphics processing unit as described herein. Furthermore, there may be provided an integrated circuit definition dataset that, when processed in an integrated circuit manufacturing system, causes the method of manufacturing a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing unit will now be described with respect to FIG. 6.

Figure 6:
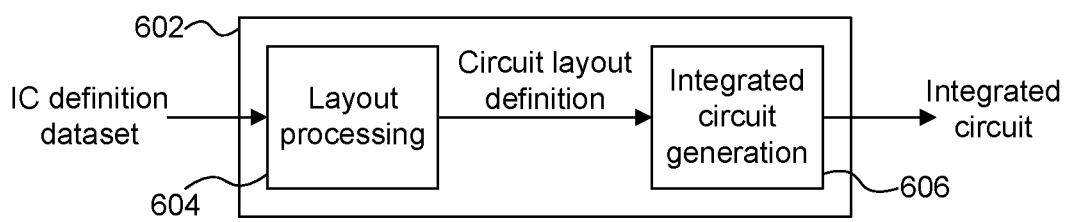
FIG. 6 shows an integrated circuit manufacturing system for generating an integrated circuit embodying a graphics processing unit as described herein.

FIG. 6 shows an example of an integrated circuit (IC) manufacturing system 602 which is configured to manufacture a graphics processing unit as described in any of the examples herein. In particular, the IC manufacturing system 602 comprises a layout processing system 604 and an integrated circuit generation system 606. The IC manufacturing system 602 is configured to receive an IC definition dataset (e.g. defining a graphics processing unit as described in any of the examples herein), process the IC definition dataset, and generate an IC according to the IC definition dataset (e.g. which embodies a graphics processing unit as described in any of the examples herein). The processing of the IC definition dataset configures the IC manufacturing system 602 to manufacture an integrated circuit embodying a graphics processing unit as described in any of the examples herein.

The layout processing system 604 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of processing a plurality of fragments in a graphics processing system which comprises: (i) hidden surface removal logic, and (ii) processing logic configured to execute shader programs for fragments, the method comprising:
receiving a first fragment to be processed, wherein the first fragment has a shader-dependent property;
processing the first fragment, wherein said processing the first fragment comprises:
performing an early depth test on the first fragment with the hidden surface removal logic using a depth buffer,
in response to the first fragment passing the early depth test, executing one or more instructions of a shader program for the first fragment on the processing logic to determine the property of the first fragment, and
after the determination of the property of the first fragment, performing a late depth test on the first fragment with the hidden surface removal logic using the depth buffer;
after said receiving a first fragment, receiving a second fragment to be processed, wherein the second fragment does not have a shader-dependent property; and
processing the second fragment, wherein said processing the second fragment comprises, before said late depth test is performed on the first fragment, performing an early depth test on the second fragment with the hidden surface removal logic;
wherein the shader-dependent property of a fragment affects the processing performed on that fragment by the hidden surface removal logic.

2. The method of claim 1, wherein said processing the first fragment further comprises updating a depth value in the depth buffer in response to the first fragment passing the late depth test.

3. The method of claim 1, wherein said processing the second fragment does not comprise updating a depth value in the depth buffer in response to the second fragment passing the early depth test.

4. The method of claim 1, wherein said processing the second fragment further comprises, after said late depth test is performed on the first fragment, performing a late depth test on the second fragment with the hidden surface removal logic using the depth buffer.

5. The method of claim 4, wherein said processing the second fragment further comprises updating a depth value in the depth buffer in response to the second fragment passing the late depth test.

6. The method of claim 4, wherein said processing the second fragment further comprises, in response to the second fragment passing the early depth test, initiating processing of the second fragment on the processing logic which causes the late depth test to be performed on the second fragment.

7. The method of claim 6, wherein said processing the second fragment further comprises:
in response to causing the late depth test to be performed on the second fragment, pausing the execution of a shader program for the second fragment while the late depth test is performed on the second fragment with the hidden surface removal logic; and
in response to the second fragment passing the late depth test, executing a one or more instructions of the shader program for the second fragment on the processing logic.

8. The method of claim 1, wherein said processing the first fragment further comprises, in response to the first fragment passing the late depth test, executing a further one or more instructions of the shader program for the first fragment on the processing logic.

9. The method of claim 1, wherein the plurality of fragments are ordered according to a submission order, and wherein the plurality of fragments are processed in accordance with the submission order.

10. The method of claim 1, wherein said early depth test on the second fragment is performed in response to determining that the first and second fragments have compatible depth compare modes.

11. The method of claim 1, further comprising:
fetching primitive data defining primitives in a scene to be rendered;
performing rasterization on the primitives to generate fragments, wherein said first fragment is generated by performing rasterization on a first primitive which has a shader-dependent property, and wherein said second fragment is generated by performing rasterization on a second primitive which does not have a shader-dependent property; and
before performing said processing of the second fragment, determining that there is at least one preceding fragment for which a late depth test is still to be performed.

12. The method of claim 11, wherein:
said determining that there is at least one preceding fragment for which a late depth test is still to be performed is performed in response to fetching primitive data for the second primitive, and
said rasterization on the second primitive is performed in response to determining that there is at least one preceding fragment for which a late depth test is still to be performed.

13. The method of claim 1, further comprising:
after said receiving a second fragment, receiving a third fragment to be processed, wherein the third fragment does not have a shader-dependent property;
determining that there are no preceding fragments for which a late depth test is still to be performed; and
after determining that there are no preceding fragments for which a late depth test is still to be performed, processing the third fragment, wherein said processing the third fragment comprises performing a single depth test on the third fragment with the hidden surface removal logic using the depth buffer.

14. The method of claim 1, further comprising:
storing, for each of a plurality of depth values in the depth buffer, an in-flight indication to indicate whether there are any preceding fragments for which a late depth test is still to be performed;
wherein said performing an early depth test on the second fragment with the hidden surface removal logic is performed using the depth buffer in response to determining that the in-flight indication for the depth value in the depth buffer at a position corresponding to the second fragment indicates that there is at least one preceding fragment for which a late depth test is still to be performed.

15. The method of claim 1, further comprising:
for each of the depth values in the depth buffer for which there is at least one preceding fragment for which a late depth test is still to be performed which could cause an update to that depth value in the depth buffer, storing a depth compare mode indication to indicate a depth compare mode for said at least one fragment for which a late depth test is still to be performed which could cause an update to that depth value in the depth buffer;
wherein said performing an early depth test on the second fragment with the hidden surface removal logic using the depth buffer is performed in response to determining that a depth compare mode of the second fragment is compatible with the depth compare mode indicated by the depth compare mode indication for the depth value in the depth buffer at a position corresponding to the second fragment.

16. The method of claim 1, further comprising:
determining a utilization indication which indicates a level of utilization of the processing logic;
wherein said performing an early depth test on the second fragment with the hidden surface removal logic is performed in response to determining that the indicated level of utilization of the processing logic is below a threshold level of utilization.

17. The method of claim 16, wherein the utilization indication is based on one or more of:
a state of a task queue which holds pending tasks to be processed by the processing logic;
a number of instructions that are still to be executed in one or more shader programs that are currently being executed by the processing logic;
a number of tasks that have been mapped to an execution slot on the processing logic which are enabled and potentially running or are paused; and
a number of tasks that will be created and passed to the processing logic to be processed when a tag buffer is flushed.

18. A graphics processing unit configured to process a plurality of fragments, the graphics processing unit comprising:
hidden surface removal logic; and
processing logic configured to execute shader programs for fragments;
wherein the graphics processing unit is configured to:
receive, at the hidden surface removal logic, a first fragment to be processed,
wherein the first fragment has a shader-dependent property,
process the first fragment, wherein to process the first fragment the graphics processing unit is configured to:
perform an early depth test on the first fragment with the hidden surface removal logic using a depth buffer,
in response to the first fragment passing the early depth test, execute one or more instructions of a shader program for the first fragment on the processing logic to determine the property of the first fragment, and
after the determination of the property of the first fragment, perform a late depth test on the first fragment with the hidden surface removal logic using the depth buffer;
after the first fragment is received, receive at the hidden surface removal logic a second fragment to be processed, wherein the second fragment does not have a shader-dependent property, and
process the second fragment, wherein to process the second fragment the graphics processing unit is configured to, before said late depth test is performed on the first fragment, perform an early depth test on the second fragment with the hidden surface removal logic;
wherein the shader-dependent property of a fragment affects the processing performed on that fragment by the hidden surface removal logic.

19. The graphics processing unit of claim 18, wherein to process the first fragment the graphics processing unit is further configured to update a depth value in the depth buffer in response to the first fragment passing the late depth test.

20. A non-transitory computer readable storage medium having stored thereon an integrated circuit definition dataset that, when processed in an integrated circuit manufacturing system, configures the integrated circuit manufacturing system to manufacture a graphics processing unit comprising:
hidden surface removal logic; and
processing logic configured to execute shader programs for fragments;
wherein the graphics processing unit is configured to:
receive, at the hidden surface removal logic, a first fragment to be processed,
wherein the first fragment has a shader-dependent property,
process the first fragment, wherein to process the first fragment the graphics processing unit is configured to:
perform an early depth test on the first fragment with the hidden surface removal logic using a depth buffer,
in response to the first fragment passing the early depth test, execute one or more instructions of a shader program for the first fragment on the processing logic to determine the property of the first fragment, and
after the determination of the property of the first fragment, perform a late depth test on the first fragment with the hidden surface removal logic using the depth buffer;
after the first fragment is received, receive at the hidden surface removal logic a second fragment to be processed, wherein the second fragment does not have a shader-dependent property, and
process the second fragment, wherein to process the second fragment the graphics processing unit is configured to, before said late depth test is performed on the first fragment, perform an early depth test on the second fragment with the hidden surface removal logic;
wherein the shader-dependent property of a fragment affects the processing performed on that fragment by the hidden surface removal logic.

* * * * *